United States Patent
Shen

(10) Patent No.: US 12,063,607 B2
(45) Date of Patent: Aug. 13, 2024

(54) SIMULTANEOUS RESPONSE METHOD AND DEVICE

(71) Applicant: Huawei Technologies Co., Ltd., Shenzhen (CN)

(72) Inventor: Wenjing Shen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 368 days.

(21) Appl. No.: 17/626,335

(22) PCT Filed: Jul. 22, 2020

(86) PCT No.: PCT/CN2020/103586
§ 371 (c)(1),
(2) Date: Jan. 11, 2022

(87) PCT Pub. No.: WO2021/013196
PCT Pub. Date: Jan. 28, 2021

(65) Prior Publication Data
US 2022/0272645 A1   Aug. 25, 2022

(30) Foreign Application Priority Data
Jul. 25, 2019   (CN) .......................... 201910678890.4

(51) Int. Cl.
*H04W 56/00* (2009.01)
*G06F 3/16* (2006.01)
(Continued)

(52) U.S. Cl.
CPC ............ *H04W 56/001* (2013.01); *G06F 3/16* (2013.01); *H04W 52/0254* (2013.01); *H04W 84/12* (2013.01)

(58) Field of Classification Search
CPC ........... H04W 56/001; H04W 52/0254; H04W 84/12; H04W 4/80; H04W 4/70;
(Continued)

(56) References Cited

U.S. PATENT DOCUMENTS 9,521,449 B2   12/2016   Kidron
10,255,032 B2   4/2019   Yu et al.
(Continued)

FOREIGN PATENT DOCUMENTS

CN   102404280 A   4/2012
CN   104168639 A   11/2014
(Continued)

OTHER PUBLICATIONS

Wang Chenyang, "Design and Implementation of Video Surveillance Network and Time Synchronization," Thesis of Nanjing University of Posts and Telecommunications, May 2012, with then English Abstract, 74 pages.

*Primary Examiner* — Vinncelas Louis
(74) *Attorney, Agent, or Firm* — Conley Rose, P.C.

(57) ABSTRACT

A method for simultaneous response consistency and user experience includes, in response to detecting a response indication, a first electronic device that sends a response instruction to a second electronic device after a duration T−t1, and sends a response instruction to a third electronic device after a duration T−t2. The first electronic device performs a response operation after a target duration T, where T is greater than or equal to a maximum time consumption t, and t is a larger one of a first time consumption t1 between the first electronic device and the second electronic device and a second time consumption t2 between the first electronic device and the third electronic device.

(Continued)

The second electronic device and the third electronic device each performs a response operation in response to receiving the response instruction.

20 Claims, 14 Drawing Sheets

(51) Int. Cl.
*H04W 52/02* (2009.01)
*H04W 84/12* (2009.01)

(58) Field of Classification Search
CPC ..... H04W 56/0015; H04W 84/18; G06F 3/16; G06F 9/4418; G06F 1/12; H04L 65/61; H04L 65/80; H04N 21/242; H04N 21/43615; H04N 21/8547; H04N 21/4302
See application file for complete search history.

(56) References Cited

U.S. PATENT DOCUMENTS

| 2003/0108164 | A1 | 6/2003 | Laurin et al. |
| 2008/0008141 | A1 | 1/2008 | Tchigevsky et al. |
| 2012/0144435 | A1 | 6/2012 | Spilo et al. |
| 2014/0053711 | A1 | 2/2014 | Serletic, II et al. |
| 2017/0060599 | A1* | 3/2017 | Chen ...................... G06F 9/4418 |
| 2018/0167645 | A1* | 6/2018 | Yu .............................. G06F 1/12 |
| 2022/0272645 | A1 | 8/2022 | Shen |

FOREIGN PATENT DOCUMENTS

| CN | 104469218 | A | | 3/2015 |
| CN | 104751864 | A | | 7/2015 |
| CN | 105049923 | A | | 11/2015 |
| CN | 106331120 | A | | 1/2017 |
| CN | 107733745 | A | | 2/2018 |
| CN | 107947889 | A | | 4/2018 |
| CN | 108962263 | A | | 12/2018 |
| CN | 109041200 | A | | 12/2018 |
| CN | 109215663 | A | | 1/2019 |
| CN | 110572799 | A | | 12/2019 |
| CN | 117062256 | A | * | 11/2023 |
| JP | 2010011274 | A | | 1/2010 |
| WO | 2011075867 | A1 | | 6/2011 |
| WO | 2014040667 | A1 | | 3/2014 |

* cited by examiner

SIMULTANEOUS RESPONSE METHOD AND DEVICE

CROSS-REFERENCE TO RELATED APPLICATIONS

The is a U.S. National Stage of International Patent Application No. PCT/CN2020/103586 filed on Jul. 22, 2020, which claims priority to Chinese Patent Application No. 201910678890.4 filed on Jul. 25, 2019. Both of the aforementioned applications are hereby incorporated by reference in their entireties.

TECHNICAL FIELD

Embodiments of this application relate to the field of electronic technologies, and in particular, to a simultaneous response method and a device.

BACKGROUND

Simultaneous response from a plurality of devices is of great significance in scenarios such as audio synchronization, audio and video synchronization, and wake-up synchronization. The simultaneous response from the plurality of devices can improve user experience.

The plurality of devices for simultaneous response may have a primary-secondary relationship. In the conventional technology, a primary device and a secondary device each may obtain standard time from a clock source site, to perform network clock synchronization. Then, the primary device may send an instruction to the secondary device to instruct the secondary device to simultaneously make a response at a target moment. The primary device and the secondary device each set a timer, and the primary device and the secondary device each make a response when the timer expires, that is, after the target moment is reached.

Because there are different degrees of delays in network transmission from the clock source site to different devices, the different devices each receive the standard time at different moments. In this case, the different devices also set different clocks based on the received standard time, and the target moment is reached at different actual moments on the different devices. Consequently, the plurality of devices cannot simultaneously make a response, resulting in poor simultaneous response consistency and poor user experience.

For example, the plurality devices include a sound box 1 and a sound box 2. After being woken up by a user, the sound box 1 and the sound box 2 turn on light rings to make a response. Because simultaneous response consistency between the plurality of devices is relatively poor in the conventional technology, as shown in FIG. 1, processes of turning on light rings by a sound box 1 and a sound box 2 are difficult to synchronize. As a result, visual user experience is poor.

SUMMARY

Embodiments of this application provide a simultaneous response method and a device, to reduce simultaneous response time errors of a plurality of devices, improve simultaneous response consistency, and improve user experience.

To achieve the foregoing objectives, the following technical solutions are used in the embodiments of this application.

According to one aspect, a technical solution of this application provides a simultaneous response method, applied to a first electronic device, a second electronic device, and a third electronic device in a same local area network. The method includes: The first electronic device detects a response indication. The first electronic device sends a first response instruction to the second electronic device after duration T−t1 in response to detecting the response indication, where the first response instruction is used to instruct the second electronic device to perform a response operation. The first electronic device sends a second response instruction to the third electronic device after duration T−t2, where the second response instruction is used to instruct the third electronic device to perform a response operation. The first electronic device performs a response operation after target duration T, where the target duration T is greater than or equal to maximum time consumption t for transmission, the maximum time consumption t for transmission is a larger one of first time consumption t1 for transmission and second time consumption t2 for transmission, the first time consumption t1 for transmission is duration for data transmission between the first electronic device and the second electronic device, and the second time consumption t2 for transmission is duration for data transmission between the first electronic device and the third electronic device. The second electronic device immediately performs the response operation in response to receiving the first response instruction. The third electronic device immediately performs the response operation in response to receiving the second response instruction.

In this solution, the first electronic device may be a primary device, and the second electronic device and the third electronic device may be secondary devices. Time consumption t for transmission between the primary device and the secondary devices is considered and offset at a primary device side. This avoids a simultaneous response error caused by the time consumption t for transmission, and improves simultaneous response consistency. There is no need to obtain standard time through network clock synchronization, and this avoids a delay caused by network clock synchronization, improves simultaneous response consistency between the primary device and the secondary devices, and improves user experience.

In addition, the primary device side calculates timing duration and sets a plurality of timers. Devices for calculating the timing duration are a same device, and the plurality of timers are implemented based on physical clock timers of the same device. There is no need to separately calculate duration of timers by different devices and set the timers on the different devices, and this can further avoid errors of time consumption for calculation of the devices and timer errors of the different devices. This can further reduce simultaneous response errors of the group of electronic devices, improve simultaneous response consistency, and improve user experience.

According to another aspect, a technical solution of this application provides a simultaneous response method, applied to a first electronic device, a second electronic device, and a third electronic device in a same local area network. The method includes: The first electronic device sends target duration T and first time consumption t1 for transmission to the second electronic device. The first electronic device sends the target duration T and second time consumption t2 for transmission to the third electronic device, where the target duration T is greater than or equal to maximum time consumption t for transmission, the maximum time consumption t for transmission is a larger one of the first time consumption t1 for transmission and the second time consumption t2 for transmission, the first time consumption t1 for transmission is duration for data transmission between the first electronic device and the second electronic device, and the second time consumption t2 for transmission is duration for data transmission between the first electronic device and the third electronic device. The second electronic device receives the target duration T and the first time consumption t1 for transmission that are sent by the first electronic device. The third electronic device receives the target duration T and the second time consumption t2 for transmission that are sent by the first electronic device. The first electronic device detects a response indication. The first electronic device separately sends a response instruction to the second electronic device and the third electronic device in response to detecting the response indication, where the response instruction is used to instruct to perform a response operation. The first electronic device performs a response operation after the target duration T. The second electronic device performs the response operation after duration T−t1 in response to receiving the response instruction. The third electronic device performs the response operation after duration T−t2 in response to receiving the response instruction.

In this solution, the first electronic device may send the target duration and the time consumption t for transmission to the second electronic device and the third electronic device in advance. After the first electronic device detects the response indication, the second electronic device and the third electronic device may simultaneously make a response based on the target duration and the time consumption t for transmission. The first electronic device may be a primary device, and the second electronic device and the third electronic device may be secondary devices. Time consumption t for transmission between the primary device and the secondary devices is considered and offset at a secondary device side when simultaneous response is performed. This avoids a simultaneous response error caused by the time consumption t for transmission, and improves simultaneous response consistency. There is no need to obtain standard time through network clock synchronization, and this avoids a delay caused by network clock synchronization, improves simultaneous response consistency between the primary device and the secondary devices, and improves user experience.

According to another aspect, a technical solution of this application provides a simultaneous response method, applied to a first electronic device, a second electronic device, and a third electronic device in a same local area network. The method includes: The first electronic device detects a response indication. The first electronic device sends a first response instruction to the second electronic device in response to detecting the response indication, where the first response instruction is used to instruct the second electronic device to perform a response operation, and the first response instruction includes target duration T and first time consumption t1 for transmission. The first electronic device sends a second response instruction to the third electronic device, where the second response instruction is used to instruct the third electronic device to perform a response operation, and the second response instruction includes the target duration T and second time consumption t2 for transmission. The first electronic device performs a response operation after the target duration T, where the target duration T is greater than or equal to maximum time consumption t for transmission, the maximum time consumption t for transmission is a larger one of the first time consumption t1 for transmission and the second time consumption t2 for transmission, the first time consumption t1 for transmission is duration for data transmission between the first electronic device and the second electronic device, and the second time consumption t2 for transmission is duration for data transmission between the first electronic device and the third electronic device. The second electronic device performs the response operation after duration T−t1 in response to receiving the first response instruction. The third electronic device performs the response operation after duration T−t2 in response to receiving the second response instruction.

In this solution, the first electronic device may be a primary device, and the second electronic device and the third electronic device may be secondary devices. The primary device and the secondary devices may perform simultaneous response based on relative times. Time consumption t for transmission between the primary device and the secondary devices is considered and offset at a secondary device side. This avoids a simultaneous response error caused by the time consumption t for transmission. There is no need to obtain standard time through network clock synchronization, and this avoids a delay caused by network clock synchronization, improves simultaneous response consistency between the primary device and the secondary devices, and improves user experience.

According to another aspect, a technical solution of this application provides a simultaneous response method, applied to a first electronic device and a second electronic device in a same local area network. The method includes: The first electronic device detects a response indication. The first electronic device sends a response instruction to the second electronic device in response to detecting the response indication, where the response instruction is used to instruct the second electronic device to perform a response operation. The first electronic device performs a response operation after time consumption t1 for transmission, where the time consumption t1 for transmission is duration for data transmission between the first electronic device and the second electronic device. The second electronic device immediately performs the response operation in response to receiving the response instruction.

In this solution, the first electronic device may be a primary device, and the second electronic device may be a secondary device. Time consumption t for transmission is considered and offset at a primary device side when simultaneous response is performed. This avoids a simultaneous response error caused by the time consumption t for transmission, and improves simultaneous response consistency. There is no need to obtain standard time through network clock synchronization, and this avoids a delay caused by network clock synchronization, improves simultaneous response consistency between the primary device and the secondary device, and improves user experience.

According to another aspect, a technical solution of this application provides a simultaneous response method, applied to a first electronic device and a second electronic device in a same local area network. The method includes: The first electronic device detects a response indication. The first electronic device sends a response instruction to the second electronic device after T−t1 in response to detecting the response indication, where the response instruction is used to instruct the second electronic device to perform a response operation. The first electronic device performs a response operation after target duration T. The second electronic device immediately performs the response operation in response to receiving the response instruction, where the target duration T is greater than or equal to time consumption t1 for transmission, and the time consumption t1 for transmission is duration for data transmission between the first electronic device and the second electronic device.

In this solution, the first electronic device may be a primary device, and the second electronic device may be a secondary device. Time consumption t for transmission is considered and offset at a primary device side when simultaneous response is performed. This avoids a simultaneous response error caused by the time consumption t for transmission, and improves simultaneous response consistency.

According to another aspect, a technical solution of this application provides a simultaneous response method, applied to a first electronic device and a second electronic device in a same local area network. The method includes: The first electronic device sends target duration T and time consumption t1 for transmission to the second electronic device. The first electronic device detects a response indication. The first electronic device sends a response instruction to the second electronic device in response to detecting the response indication, where the response instruction is used to instruct the second electronic device to perform a response operation. The first electronic device performs a response operation after the target duration T. The second electronic device performs a response operation after T−t1 in response to receiving the response instruction, where the target duration T is greater than or equal to time consumption t1 for transmission, and the time consumption t1 for transmission is duration for data transmission between the first electronic device and the second electronic device.

In this solution, the first electronic device may be a primary device, and the second electronic device may be a secondary device. The primary device may send the target duration T and the time consumption t1 for transmission to the secondary device in advance. The time consumption t for transmission is considered and offset at a secondary device side based on the target duration T and the time consumption t1 for transmission when simultaneous response is performed. This avoids a simultaneous response error caused by the time consumption t for transmission, and improves simultaneous response consistency.

According to another aspect, a technical solution of this application provides a simultaneous response method, applied to a first electronic device and a second electronic device in a same local area network. The method includes: The first electronic device detects a response indication. The first electronic device sends a response instruction to the second electronic device in response to detecting the response indication, where the response instruction is used to instruct the second electronic device to perform a response operation, and the response instruction includes target duration T and time consumption t1 for transmission. The first electronic device performs a response operation after the target duration T. The second electronic device performs a response operation after T−t1 in response to receiving the response instruction, where the target duration T is greater than or equal to the time consumption t1 for transmission, and the time consumption t1 for transmission is duration for data transmission between the first electronic device and the second electronic device.

In this solution, the first electronic device may be a primary device, and the second electronic device may be a secondary device. The time consumption t for transmission is considered and offset at a secondary device side based on the target duration T and the time consumption t1 for transmission when simultaneous response is performed. This avoids a simultaneous response error caused by the time consumption t for transmission, and improves simultaneous response consistency.

In a possible design, before the first electronic device sends the target duration T to the second electronic device and the third electronic device, where the target duration T is greater than or equal to the maximum time consumption t for transmission, the method further includes: The first electronic device measures the first time consumption t1 for transmission and the second time consumption t2 for transmission. The first electronic device determines the maximum time consumption t for transmission based on the first time consumption t1 for transmission and the second time consumption t2 for transmission.

In this solution, the first electronic device may be a primary device. When the primary device measures time consumption t for transmission between the primary device and different secondary devices, an execution body in a measurement process is enabled to be a same primary device. This can avoid measurement errors caused when different electronic devices separately measure time consumption t for transmission, and improves measurement precision.

In another possible design, that the first electronic device measures the first time consumption t1 for transmission and the second time consumption t2 for transmission includes: The first electronic device measures the first time consumption t1 for transmission and the second time consumption t2 for transmission after the first electronic device is paired with the second electronic device and the third electronic device, or after the first electronic device re-accesses the local area network.

It may be understood that, when a network disconnection occurs, time consumption t for transmission between the primary device and the secondary devices may change. Therefore, after the network disconnection occurs and the local area network is re-accessed, time consumption t for transmission may be measured again.

In another possible design, that the first electronic device detects a response indication includes: The first electronic device detects a voice wake-up indication from a user; or the first electronic device receives wake-up indication information sent by the second electronic device or the third electronic device.

It may be understood that the first electronic device may detect the response indication in a plurality of manners.

In another possible design, the first electronic device, the second electronic device, and the third electronic device are a group of stereo audio devices that cooperate with each other, a group of audio and video devices that cooperate with each other, or a group of audio and light devices that cooperate with each other.

In another possible design, the local area network is a wireless fidelity Wi-Fi wireless local area network.

In other words, the first electronic device, the second electronic device, and the third electronic device may be a group of devices in the Wi-Fi local area network.

According to another aspect, an embodiment of this application provides a response method, applied to a first electronic device. The first electronic device, a second electronic device, and a third electronic device belong to a same local area network. The method includes: The first electronic device detects a response indication. The first electronic device sends a first response instruction to the second electronic device after duration T−t1 in response to detecting the response indication, where the first response instruction is used to instruct to perform a response operation. The first electronic device sends a second response instruction to the third electronic device after duration T−t2. The first electronic device performs a response operation after target duration T, where the target duration T is greater than or equal to maximum time consumption t for transmission, the maximum time consumption t for transmission is a larger one of first time consumption t1 for transmission and second time consumption t2 for transmission, the first time consumption t1 for transmission is duration for data transmission between the first electronic device and the second electronic device, and the second time consumption t2 for transmission is duration for data transmission between the first electronic device and the third electronic device.

In this solution, the first electronic device may be a primary device, and time consumption t for transmission between the primary device and secondary devices is considered and offset at a primary device side. This avoids a simultaneous response error caused by the time consumption t for transmission, and improves simultaneous response consistency. In addition, the primary device side calculates timing duration and sets a plurality of timers. Devices for calculating the timing duration are a same device, and the plurality of timers are implemented based on physical clock timers of the same device. There is no need to separately calculate duration of timers by different devices and set the timers on the different devices, and this can further avoid errors of time consumption for calculation of the devices and timer errors of the different devices.

According to another aspect, an embodiment of this application provides a response method, applied to a first electronic device. The first electronic device, a second electronic device, and a third electronic device belong to a same local area network. The method includes: The first electronic device sends target duration T and first time consumption t1 for transmission to the second electronic device. The first electronic device sends the target duration T and second time consumption t2 for transmission to the third electronic device, where the target duration T is greater than or equal to maximum time consumption t for transmission, the maximum time consumption t for transmission is a larger one of the first time consumption t1 for transmission and the second time consumption t2 for transmission, the first time consumption t1 for transmission is duration for data transmission between the first electronic device and the second electronic device, and the second time consumption t2 for transmission is duration for data transmission between the first electronic device and the third electronic device. The first electronic device detects a response indication. The first electronic device separately sends a response instruction to the second electronic device and the third electronic device in response to detecting the response indication, where the response instruction is used to instruct to perform a response operation. The first electronic device performs a response operation after the target duration T.

In this solution, the first electronic device may send the target duration and the time consumption t for transmission to the second electronic device and the third electronic device in advance. In this way, after the first electronic device detects the response indication, the second electronic device and the third electronic device may offset, based on the target duration and the time consumption t for transmission, the time consumption t for transmission between the second electronic device, the third electronic device, and the first electronic device. This avoids a simultaneous response error caused by the time consumption t for transmission, and improves simultaneous response consistency.

According to another aspect, an embodiment of this application provides a response method, applied to a first electronic device. The first electronic device, a second electronic device, and a third electronic device belong to a same local area network. The method includes: The first electronic device detects a response indication. The first electronic device sends a first response instruction to the second electronic device in response to detecting the response indication, where the first response instruction is used to instruct to perform a response operation, and the first response instruction includes target duration T and first time consumption t1 for transmission. The first electronic device sends a second response instruction to the third electronic device, where the second response instruction is used to instruct to perform a response operation, and the second response instruction includes the target duration T and second time consumption t2 for transmission. The first electronic device performs a response operation after the target duration T, where the target duration T is greater than or equal to maximum time consumption t for transmission, the maximum time consumption t for transmission is a larger one of the first time consumption t1 for transmission and the second time consumption t2 for transmission, the first time consumption t1 for transmission is duration for data transmission between the first electronic device and the second electronic device, and the second time consumption t2 for transmission is duration for data transmission between the first electronic device and the third electronic device.

In this solution, the first electronic device may be a primary device, and the second electronic device and the third electronic device may be secondary devices. The primary device and the secondary devices may perform simultaneous response based on relative times. There is no need to obtain standard time through network clock synchronization, and this avoids a delay caused by network clock synchronization, improves simultaneous response consistency between the primary device and the secondary devices, and improves user experience.

According to another aspect, an embodiment of this application provides a response method, applied to a first electronic device. The first electronic device and a second electronic device belong to a same local area network. The method includes: The first electronic device detects a response indication. The first electronic device sends a response instruction to the second electronic device in response to detecting the response indication, where the response instruction is used to instruct the second electronic device to perform a response operation. The first electronic device performs a response operation after time consumption t1 for transmission, where the time consumption t1 for transmission is duration for data transmission between the first electronic device and the second electronic device.

In this solution, the first electronic device may be a primary device, and the second electronic device may be a secondary device. The time consumption t for transmission is considered and offset at a primary device side when simultaneous response is performed. This avoids a simultaneous response error caused by the time consumption t for transmission, and improves simultaneous response consistency. There is no need to obtain standard time through network clock synchronization, and this avoids a delay caused by network clock synchronization, improves simultaneous response consistency between the primary device and the secondary device, and improves user experience.

According to another aspect, a technical solution of this application provides a simultaneous response method, applied to a first electronic device. The first electronic device and a second electronic device belong to a same local area network. The method includes: The first electronic device detects a response indication. The first electronic device sends a response instruction to the second electronic device after T−t1 in response to detecting the response indication, where the response instruction is used to instruct the second electronic device to perform a response operation. The first electronic device performs a response operation after target duration T, where the target duration T is greater than or equal to time consumption t1 for transmission, and the time consumption t1 for transmission is duration for data transmission between the first electronic device and the second electronic device.

In this solution, the first electronic device may be a primary device, and the second electronic device may be a secondary device. The time consumption t for transmission is considered and offset at a primary device side when simultaneous response is performed. This avoids a simultaneous response error caused by the time consumption t for transmission, and improves simultaneous response consistency.

According to another aspect, a technical solution of this application provides a simultaneous response method, applied to a first electronic device. The first electronic device and a second electronic device belong to a same local area network. The method includes: The first electronic device detects a response indication. The first electronic device sends a response instruction to the second electronic device in response to detecting the response indication, where the response instruction is used to instruct the second electronic device to perform a response operation, and the response instruction includes target duration T and time consumption t1 for transmission. The first electronic device performs a response operation after the target duration T, where the target duration T is greater than or equal to time consumption t1 for transmission, and the time consumption t1 for transmission is duration for data transmission between the first electronic device and the second electronic device.

In this solution, the first electronic device may be a primary device, and the second electronic device may be a secondary device. The primary device may send the target duration and the time consumption t for transmission to the secondary device in advance when simultaneous response is performed, so that the time consumption t for transmission is considered and offset at a secondary device side. This avoids a simultaneous response error caused by the time consumption t for transmission, and improves simultaneous response consistency.

According to another aspect, a technical solution of this application provides a simultaneous response method, applied to a first electronic device. The first electronic device and a second electronic device belong to a same local area network. The method includes: The first electronic device sends target duration T and time consumption t1 for transmission to the second electronic device. The first electronic device detects a response indication. The first electronic device sends a response instruction to the second electronic device in response to detecting the response indication, where the response instruction is used to instruct the second electronic device to perform a response operation. The first electronic device performs a response operation after the target duration T, where the target duration T is greater than or equal to the time consumption t1 for transmission, and the time consumption t1 for transmission is duration for data transmission between the first electronic device and the second electronic device.

In this solution, the first electronic device may be a primary device, and the second electronic device may be a secondary device. The primary device may send the target duration and the time consumption t for transmission to the secondary device when simultaneous response is performed, so that the time consumption t for transmission is considered and offset at a secondary device side. This avoids a simultaneous response error caused by the time consumption t for transmission, and improves simultaneous response consistency.

In a possible design, before the first electronic device sends the target duration T to the second electronic device and the third electronic device, where the target duration T is greater than or equal to the maximum time consumption t for transmission, the method further includes: The first electronic device measures the first time consumption t1 for transmission and the second time consumption t2 for transmission. The first electronic device determines the maximum time consumption t for transmission based on the first time consumption t1 for transmission and the second time consumption t2 for transmission.

In another possible design, that the first electronic device measures the first time consumption t1 for transmission and the second time consumption t2 for transmission includes: The first electronic device measures the first time consumption t1 for transmission and the second time consumption t2 for transmission after the first electronic device is paired with the second electronic device and the third electronic device, or after the first electronic device re-accesses the local area network.

In another possible design, that the first electronic device detects a response indication includes: The first electronic device detects a voice wake-up indication from a user; or the first electronic device receives wake-up indication information sent by the second electronic device or the third electronic device.

In another possible design, the first electronic device, the second electronic device, and the third electronic device are a group of stereo audio devices that cooperate with each other, a group of audio and video devices that cooperate with each other, or a group of audio and light devices that cooperate with each other.

According to another aspect, a technical solution of this application provides a response method, applied to a second electronic device. The second electronic device and a first electronic device belong to a same local area network. The method includes: The second electronic device receives target duration T, first time consumption t1 for transmission between the second electronic device and the first electronic device and a response instruction that are sent by the first electronic device, where the response instruction is used to instruct to perform a response operation, and the target duration T is greater than or equal to the first time consumption t1 for transmission. The second electronic device performs a response operation after duration T−t1 in response to receiving the response instruction.

In this solution, the second electronic device may obtain the target duration and the time consumption t for transmission from the first electronic device in advance. After receiving the response instruction sent by the first electronic device, the second electronic device and the first electronic device may perform simultaneous response based on the target duration and the time consumption t for transmission. The time consumption t for transmission between the first electronic device and the second electronic device is considered and offset at a second electronic device side when simultaneous response is performed. This avoids a simultaneous response error caused by the time consumption t for transmission, and improves simultaneous response consistency. There is no need to obtain standard time through network clock synchronization, and this avoids a delay caused by network clock synchronization, improves simultaneous response consistency between the devices, and improves user experience.

According to another aspect, a technical solution of this application provides a response method, applied to a second electronic device. The second electronic device and a first electronic device belong to a same local area network. The method includes: The second electronic device receives a first response instruction sent by the first electronic device, where the first response instruction is used to instruct to perform a response operation, the first response instruction includes target duration T and first time consumption t1 for transmission between the first electronic device and the second electronic device, and the target duration T is greater than or equal to the first time consumption t1 for transmission. The second electronic device performs a response operation after duration T−t1 in response to receiving the first response instruction.

In this solution, the first electronic device and the second electronic device may perform simultaneous response based on relative times. The time consumption t for transmission between the first electronic device and the second electronic device is considered and offset at a second electronic device side. There is no need to obtain standard time through network clock synchronization, and this avoids a delay caused by network clock synchronization, improves simultaneous response consistency between the devices, and improves user experience.

According to another aspect, an embodiment of this application provides a response method, applied to a second electronic device. The second electronic device and a first electronic device belong to a same local area network. The method includes: The second electronic device receives a response instruction sent by the first electronic device. The second electronic device immediately performs a response operation in response to receiving the response instruction.

According to another aspect, a technical solution of this application provides a simultaneous response method, applied to a first electronic device, a second electronic device, and a third electronic device in a same communications network. The method includes: The first electronic device detects a response indication. The first electronic device sends a first response instruction to the second electronic device by using a forwarding device after duration T−t1 in response to detecting the response indication, where the first response instruction is used to instruct the second electronic device to perform a response operation. The first electronic device sends a second response instruction to the third electronic device by using a forwarding device after duration T−t2, where the second response instruction is used to instruct the third electronic device to perform a response operation. The first electronic device performs a response operation after target duration T, where the target duration T is greater than or equal to maximum time consumption t for transmission, the maximum time consumption t for transmission is a larger one of first time consumption t1 for transmission and second time consumption t2 for transmission, the first time consumption t1 for transmission is duration for data transmission between the first electronic device and the second electronic device, and the second time consumption t2 for transmission is duration for data transmission between the first electronic device and the third electronic device. The second electronic device immediately performs the response operation in response to receiving the first response instruction. The third electronic device immediately performs the response operation in response to receiving the second response instruction.

In this solution, in the communications network, the first electronic device may be a primary device, and the second electronic device and the third electronic device may be secondary devices. Time consumption t for transmission between the primary device and the secondary devices is considered and offset at a primary device side. In addition, the primary device side calculates timing duration and sets a plurality of timers. Devices for calculating the timing duration are a same device, and the plurality of timers are implemented based on physical clock timers of the same device. There is no need to separately calculate duration of timers by different devices and set the timers on the different devices, and this can further avoid errors of time consumption for calculation of the devices and timer errors of the different devices. This can reduce simultaneous response errors of the group of electronic devices, improve simultaneous response consistency, and improve user experience.

According to another aspect, a technical solution of this application provides a simultaneous response method, applied to a first electronic device, a second electronic device, and a third electronic device in a same communications network. The method includes: The first electronic device sends target duration T and first time consumption t1 for transmission to the second electronic device by using a forwarding device. The first electronic device sends the target duration T and second time consumption t2 for transmission to the third electronic device by using a forwarding device, where the target duration T is greater than or equal to maximum time consumption t for transmission, the maximum time consumption t for transmission is a larger one of the first time consumption t1 for transmission and the second time consumption t2 for transmission, the first time consumption t1 for transmission is duration for data transmission between the first electronic device and the second electronic device, and the second time consumption t2 for transmission is duration for data transmission between the first electronic device and the third electronic device. The second electronic device receives, by using the forwarding device, the target duration T and the first time consumption t1 for transmission that are sent by the first electronic device. The third electronic device receives, by using the forwarding device, the target duration T and the second time consumption t2 for transmission that are sent by the first electronic device. The first electronic device detects a response indication. The first electronic device separately sends a response instruction to the second electronic device and the third electronic device by using the forwarding devices in response to detecting the response indication, where the response instruction is used to instruct to perform a response operation. The first electronic device performs a response operation after the target duration T. The second electronic device performs a response operation after duration T−t1 in response to receiving the response instruction. The third electronic device performs a response operation after duration T−t2 in response to receiving the response instruction.

In this solution, the first electronic device in the communications network may send the target duration and the time consumption t for transmission to the second electronic device and the third electronic device in advance. After the first electronic device detects the response indication, the second electronic device and the third electronic device may simultaneously make a response based on the target duration and the time consumption t for transmission. The first electronic device may be a primary device, and the second electronic device and the third electronic device may be secondary devices. Time consumption t for transmission between the primary device and the secondary devices is considered and offset at a secondary device side when simultaneous response is performed. This avoids a simultaneous response error caused by the time consumption t for transmission, and improves simultaneous response consistency. There is no need to obtain standard time through network clock synchronization, and this avoids a delay caused by network clock synchronization, improves simultaneous response consistency between the primary device and the secondary device, and improves user experience.

According to another aspect, a technical solution of this application provides a simultaneous response method, applied to a first electronic device, a second electronic device, and a third electronic device in a same communications network. The method includes: The first electronic device detects a response indication. The first electronic device sends a first response instruction to the second electronic device by using a forwarding device in response to detecting the response indication, where the first response instruction is used to instruct the second electronic device to perform a response operation, and the first response instruction includes target duration T and first time consumption t1 for transmission. The first electronic device sends a second response instruction to the third electronic device by using a forwarding device, where the second response instruction is used to instruct the third electronic device to perform a response operation, and the second response instruction includes the target duration T and second time consumption t2 for transmission. The first electronic device performs a response operation after the target duration T, where the target duration T is greater than or equal to maximum time consumption t for transmission, the maximum time consumption t for transmission is a larger one of the first time consumption t1 for transmission and the second time consumption t2 for transmission, the first time consumption t1 for transmission is duration for data transmission between the first electronic device and the second electronic device, and the second time consumption t2 for transmission is duration for data transmission between the first electronic device and the third electronic device. The second electronic device performs the response operation after duration T−t1 in response to receiving the first response instruction. The third electronic device performs the response operation after duration T−t2 in response to receiving the second response instruction.

In this solution, in the communications network, the first electronic device may be a primary device, and the second electronic device and the third electronic device may be secondary devices. The primary device and the secondary devices may perform simultaneous response based on relative times. Time consumption t for transmission between the primary device and the secondary devices is considered and offset at a secondary device side. There is no need to obtain standard time through network clock synchronization, and this avoids a delay caused by network clock synchronization, improves simultaneous response consistency between the primary device and the secondary devices, and improves user experience.

According to another aspect, an embodiment of this application provides a response apparatus. The apparatus is included in a first electronic device, a second electronic device, or a third electronic device. The apparatus has a function of implementing behavior of the first electronic device, the second electronic device, or the third electronic device in any method of the foregoing aspects and the possible designs. The function may be implemented by hardware, or may be implemented by hardware by executing corresponding software. The hardware or the software includes at least one module or unit corresponding to the function, for example, a detection module or unit, an execution module or unit, a receiving module or unit, or a sending module or unit.

According to another aspect, an embodiment of this application provides an electronic device, including one or more processors, and a memory. The memory stores code. When the code is executed by the one or more processors, the electronic device is enabled to perform the response method in any possible design of the foregoing aspects.

According to another aspect, an embodiment of this application provides a computer storage medium, including computer instructions. When the computer instructions are run on a mobile terminal, the mobile terminal is enabled to perform the response method in any possible design of the foregoing aspects.

According to still another aspect, an embodiment of this application provides a computer program product. When the computer program product runs on a computer, the computer is enabled to perform the response method in any possible design of the foregoing aspects.

DESCRIPTION OF EMBODIMENTS

The following describes the technical solutions in embodiments of this application with reference to the accompanying drawings in the embodiments of this application. In the descriptions of the embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of the embodiments of this application, "a plurality of" means two or more.

In some scenarios, there are strict requirements for simultaneous response from a plurality of devices. For example, in a stereo playing scenario, a left-channel device and a right-channel device need to simultaneously implement playing, to implement synchronous stereo playing. For another example, in an audio and video playing scenario, an audio device and a video device need to simultaneously implement playing, to implement synchronization and consistency between a sound and a picture.

In the conventional technology, simultaneous response from a plurality of devices is usually implemented based on network clock synchronization and a timer. Network clock synchronization means that unified standard time is transferred over the internet. The standard time is absolute time. For example, a clock source site in the internet transfers the standard time to a plurality of devices over the network. The standard time is transferred through a network channel, and a transmission time period is consumed in the transfer process, that is, there is a network transmission delay. Therefore, clocks on the devices are delayed relative to the standard time after the standard time arrives at the devices. Because transmission time periods of network channels between the clock source site and the different devices are different, there are errors of delays of the clocks on the devices relative to the standard time. In addition, because the clock source site is one of several pre-deployed clock source sites, distances between the clock source site and the plurality of devices may be relatively long, resulting in a relatively long time period (which may be, for example, 10 s) for transmitting the standard time. Consequently, the delays of the clocks on the plurality of devices are relatively long relative to the standard time.

Figure 2:
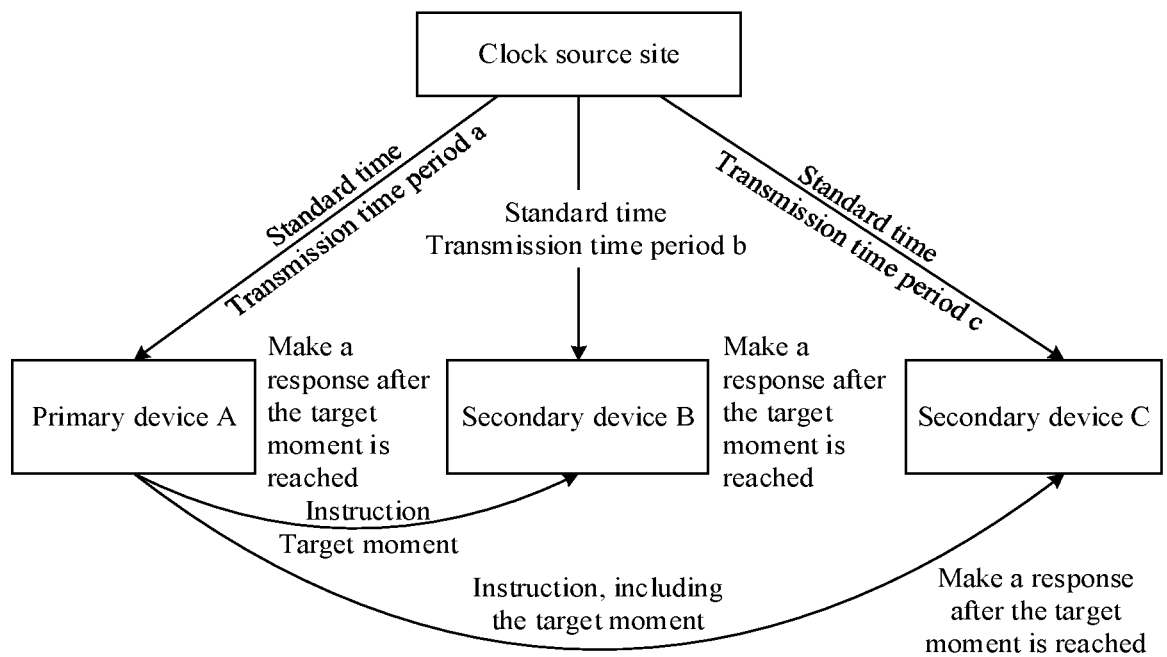
FIG. 2 is a schematic diagram of a simultaneous response principle in the conventional technology.

For example, as shown in FIG. 2, a clock source site transmits standard time to a device A, a device B, and a device C over a network. Transmission time periods consumed between the clock source site and the device A, between the clock source site and the device B, and between the clock source site and the device C are a transmission time period a, a transmission time period b, and a transmission time period c. Because different devices correspond to different transmission time periods for transmitting the standard time, and clocks on the devices are set based on the standard time, time on the clocks on device A, device B, and device C are also different relative to the standard time. The clocks on the device A, the device B, and the device C are delayed by the transmission time period a, the transmission time period b, and the transmission time period c respectively. Relative to the standard time, current moments indicated by the clocks on the device A, the device B, and the device C differ from the standard time by the transmission time period a, the transmission time period b, and the transmission time period c respectively. For example, a moment indicated by the clock on the device A is a moment 1, and actual standard time is a moment 1+a; a moment indicated by the clock on the device B is a moment 1, and actual standard time is a moment 1+b; and a moment indicated by the clock on the device C is a moment 1, and actual standard time is a moment 1+c.

The device A is a primary device, and the device B and the device C are secondary devices. The primary device A sends a response instruction to the secondary device B and the secondary device C, to instruct to make a response at a target moment. The primary device A, the secondary device B, and the secondary device C separately calculate a difference between the target moment and the current moment. The device A, the secondary device B, and the secondary device C each set a timer based on the difference calculated by the device A, the secondary device B, and the secondary device C. Because the different devices may have different operating frequencies, and chips may also have different calculation speeds, time consumption for calculation of the different devices also has errors (for example, 8 ms). In addition, timers on the different devices are implemented by using different physical clock counters. Because the physical clock counters have different operating frequencies, and also have different counting precision, timing duration of the different timers also has errors.

For example, the clock source site separately synchronizes the standard time "moment 1" to the primary device A, the secondary device B, and the secondary device C at the moment 1. The device A receives the moment 1 at the moment 1+a, the device B receives the moment 1 at the moment 1+b, and the device C receives the moment 1 at the moment 1+c. The primary device A sends a response instruction to the secondary device B and the secondary device C, to instruct to make a response at the target moment "moment 2". A difference between the moment 2 and the moment 1 is d. Duration consumed for the primary device A, the secondary device B, and the secondary device C to calculate the difference d is f1, f2, and f3 respectively. The primary device A, the secondary device B, and the secondary device C each set a timer with duration of d. A timing error of the timer on the primary device A is e1, a timing error of the timer on the secondary device B is e2, and a timing error on the timer of the secondary device C is e3. In this case, the target moment is reached after a moment 1+a+f1+d+e1 on the primary device A for response; the target moment is reached after a moment 1+b+f2+d+e2 on the secondary device B for response; and the target moment is reached after a moment 1+c+f3+d+e3 on the secondary device C for response.

In other words, in the existing simultaneous response solution, the primary device A, the secondary device B, and the secondary device C cannot simultaneously make a response at the moment 2 due to network transmission delays, errors of time consumption for calculation of the devices, timing errors of timers, and the like. The existing solution has a relatively large simultaneous response error, relatively poor simultaneous response consistency, and poor user experience. For example, in a stereo playing scenario, because a simultaneous response error is relatively large, it is difficult for a left-channel device and a right-channel device to implement synchronization playing, and as a result, a stereo playing effect is relatively poor. For another example, in an audio and video playing scenario, a sound played by an audio device is not synchronized with a picture, a subtitle, and the like played by a video device, and as a result, user experience is poor.

Figure 3:
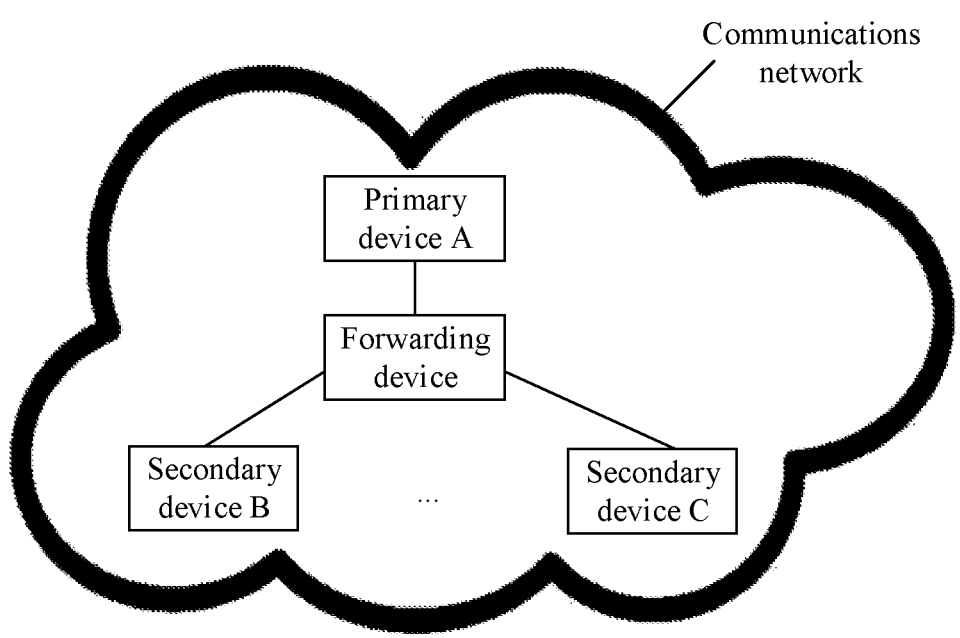
FIG. 3 is a schematic diagram of a group of electronic devices according to an embodiment of this application.

An embodiment of this application provides a simultaneous response method, applied to a group of electronic devices that are used together. As shown in FIG. 3, the group of electronic devices include a device A, a device B, a device C, and the like in a communications network. Devices such as the device A, the device B, and the device C forward information by using one or more forwarding devices (or referred to as intermediate devices), to communicate with each other. For example, the device A, the device B, and the device C forward information by using a same forwarding device, to communicate with each other.

For another example, the device A and the device B forward information by using a forwarding device 1, to communicate with each other, where the forwarding device 1 may communicate with a forwarding device 2; the device C communicates with another device through forwarding of the forwarding device 2; and the device C and the device A, or the device C and the device B forward information by using the forwarding device 1 and the forwarding device 2, to communicate with each other.

For example, the communications network may be a local area network (local area network, LAN). The group of electronic devices include the device A, the device B, and the device C in the same local area network. The local area network may be a wired local area network or a wireless local area network. The local area network is a device group including a plurality of devices that are interconnected in an area. Generally, the local area network covers a small geographical range, and a communication delay time between devices in the local area network is short. For example, when the local area network is a wireless local area network, the local area network may be specifically a Wi-Fi local area network, a Wi-Fi hotspot, a Bluetooth local area network, a Bluetooth hotspot, or the like. In some cases, a Wi-Fi local area network may include a Wi-Fi hotspot, that is, the Wi-Fi hotspot belongs to the Wi-Fi local area network. Likewise, a Bluetooth local area network may include a Bluetooth hotspot, that is, the Bluetooth hotspot belongs to the Bluetooth local area network.

The devices in the local area network usually need to forward information by using one or more forwarding devices (or referred to as intermediate devices) such as gateways, so that the devices in the local area network communicate with each other. When the local area network is a Wi-Fi local area network, the gateway device may be a wireless router. Generally, a plurality of devices managed by a same gateway may belong to a same local area network. Alternatively, a same local area network may include a plurality of devices managed by a plurality of gateways.

It may be understood that the communications network may alternatively be another communications network other than the local area network. For example, the group of electronic devices may alternatively be a group of electronic devices in a wide area network. A type of the communications network is not limited in this embodiment of this application. Alternatively, the communications network may be a wireless network formed based on a direct connection technology. For example, the group of electronic devices may be a group of electronic devices interconnected based on a near-field direct connection technology, such as Bluetooth direct connection, Wi-Fi direct connection, or Zigbee direct connection.

This group of electronic devices may include a primary device and a secondary device. For example, as shown in FIG. 3, the group of electronic devices include the primary device A, the secondary device B, and the secondary device C. In the simultaneous response method provided in this embodiment of this application, the primary device and the secondary devices may perform simultaneous response based on relative moments obtained through calculation. There is no need to obtain standard time (namely, absolute time) through network clock synchronization. This can avoid an error caused by a network transmission delay in network clock synchronization, reduce simultaneous response time errors of the group of electronic devices, improve simultaneous response consistency, and improve user experience.

In some embodiments, the primary device may further calculate timing duration of a plurality of timers and set the plurality of timers, and notify a corresponding secondary device to make a response after a timer expires. There is no need to separately calculate duration of timers by different devices and set the timers on the different devices, and this can further avoid errors of time consumption for calculation of the devices and timing errors of timers on the different devices. This can reduce simultaneous response time errors of the group of electronic devices, improve simultaneous response consistency, and improve user experience.

For example, an electronic device in the group of electronic devices may be specifically a smart home device such as a sound box, a light, a television, or a set-top box, or may be a mobile phone, a headset, a tablet computer, a wearable device, a vehicle-mounted device, an augmented reality (augment reality, AR)/a virtual reality (virtual reality, VR) device, a notebook computer, an ultra-mobile personal computer (ultra-mobile personal computer, UMPC), a netbook, or a personal digital assistant (personal digital assistant, PDA). A device type of the electronic device is not specifically limited in this embodiment of this application.

A plurality of electronic devices in the group of electronic devices may be electronic devices of a same type, or may be electronic devices of different types. For example, the group of electronic devices may be audio devices, audio/video devices, light devices, and other types of devices.

For example, the group of electronic devices include a left-channel sound box (namely, a sound box configured to play left-channel audio) and a right-channel sound box (namely, a sound box configured to play right-channel audio), that is, include a group of audio devices of a same device type. The left-channel sound box and the right-channel sound box implement simultaneous playing, to implement synchronous stereo playing.

In another example, the group of electronic devices include a video device (a television) and an audio device (a sound box), that is, include a group of electronic devices of different device types. The television and the sound box simultaneously make a response, that is, play video and audio respectively, to implement simultaneous playing of a picture and a sound.

Figure 4:
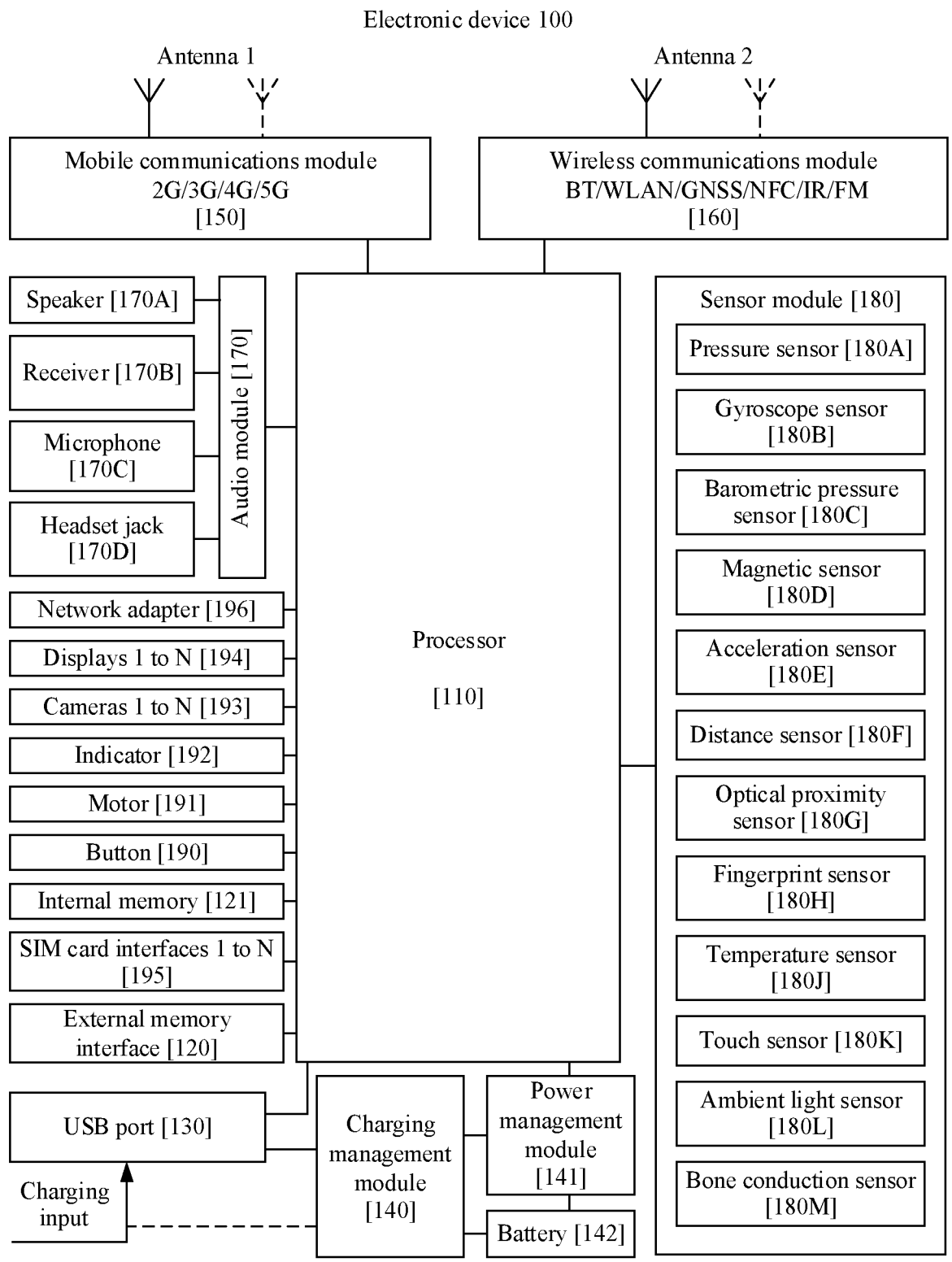
FIG. 4 is a schematic diagram of a structure of an electronic device according to an embodiment of this application.

For example, FIG. 4 is a schematic diagram of a structure of an electronic device 100. The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, a network adapter 196, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal based on instruction operation code and a time sequence signal, to complete control of instruction reading and instruction execution.

A memory may be further disposed in the processor 110, and is configured to store an instruction and data. In some embodiments, the memory in the processor 110 is a cache. The memory may store an instruction or data that has been used or is cyclically used by the processor 110. If the processor 110 needs to use the instruction or the data again, the processor may directly invoke the instruction or the data from the memory. This avoids repeated access and reduces a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, a network cable port, and/or the like. The network cable port may be configured to connect a network adapter to the internet by using a network cable, for example, to connect to a wired local area network.

For example, the I2C interface is a two-way synchronization serial bus, and includes a serial data line (serial data line, SDA) and a serial clock line (serial clock line, SCL). The processor 110 may be separately coupled to the touch sensor 180K, a charger, a flashlight, the camera 193, and the like through different I2C bus interfaces. The I2S interface may be used to perform audio communication. The PCM interface may also be used to perform audio communication, and sample, quantize, and code an analog signal. The UART interface is a universal serial data bus, and is used to perform asynchronous communication. The MIPI interface may be configured to connect the processor 110 to a peripheral component such as the display 194 or the camera 193. The GPIO interface may be configured by using software. The GPIO interface may be configured as a control signal or a data signal. The USB port 130 is a port that conforms to a USB standard specification, and may be specifically a mini USB port, a micro USB port, a USB type-C port, or the like.

It may be understood that an interface connection relationship between modules illustrated in this embodiment of this application is merely an example for description, and does not constitute a limitation on the structure of the electronic device 100. In some other embodiments of this application, the electronic device 100 may alternatively use an interface connection manner different from an interface connection manner in this embodiment, or a combination of a plurality of interface connection manners.

The charging management module 140 is configured to receive a charging input from the charger. The charger may be a wireless charger or a wired charger. The charging management module 140 may further supply power to the electronic device by using the power management module 141 while charging the battery 142.

The power management module 141 is configured to connect the battery 142 and the charging management module 140 to the processor 110. The power management module 141 receives an input from the battery 142 and/or the charging management module 140, and supplies power to the processor 110, the internal memory 121, an external memory, the display 194, the camera 193, the wireless communications module 160, and the like.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave by using the antenna 1 for radiation. In some embodiments, at least some function modules of the mobile communications module 150 may be disposed in the processor 110. In some embodiments, at least some function modules of the mobile communications module 150 and at least some modules of the processor 110 may be disposed in a same component.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transfers the low-frequency baseband signal obtained through demodulation to the baseband processor for processing. The low-frequency baseband signal is processed by the baseband processor, and then a processed low-frequency baseband signal is transferred to the application processor. The application processor outputs a sound signal by using an audio device (which is not limited to the speaker 170A, the receiver 170B, or the like), or displays an image or a video on the display 194. In some embodiments, the modem processor may be an independent component. In some other embodiments, the modem processor may be independent of the processor 110, and is disposed in a same component with the mobile communication module 150 or another function module.

The wireless communications module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, and the like and that is applied to the electronic device 100. The wireless communications module 160 may be one or more components integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave through the antenna 2 for radiation.

In this embodiment of this application, the electronic device 100 may access a wireless local area network (for example, Wi-Fi) by using the wireless communications module 160. Alternatively, the electronic device 100 may access a wired local area network through a network cable port.

In some embodiments, in the electronic device 100, the antenna 1 and the mobile communications module 150 are coupled, and the antenna 2 and the wireless communications module 160 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite-based augmentation system (satellite-based augmentation system, SBAS).

The electronic device 100 implements a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a Mini-LED, a Micro-LED, a Micro-OLED, quantum dot light emitting diodes (quantum dot light emitting diodes, QLED), or the like. In some embodiments, the electronic device 100 may include one or N displays 194, where N is a positive integer greater than 1.

The electronic device 100 can implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (charge-coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation and the like on frequency energy.

The video codec is configured to compress or decompress a digital video. The electronic device 100 may support one or more video codecs. In this way, the electronic device 100 can play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. The NPU can implement applications such as intelligent cognition of the electronic device 100, such as image recognition, facial recognition, speech recognition, and text understanding.

The external memory interface 120 may be configured to connect to an external memory card, for example, a micro SD card, to extend a storage capability of the electronic device 100. The external memory card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a sound playing function or an image playing function), and the like. The data storage area may store data (such as audio data and a phone book) created when the electronic device 100 is used, and the like. In addition, the internal memory 121 may include a high-speed random access memory, and may further include a nonvolatile memory, for example, at least one magnetic disk storage device, a flash memory, and a universal flash storage (universal flash storage, UFS).

The electronic device 100 may implement an audio function, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode over the speaker 170A.

The receiver 170B, also referred to as an "earpiece", is configured to convert an audio electrical signal into a sound signal. When a call is answered or audio information is listened to by using the electronic device 100, the receiver 170B may be put close to a human ear to listen to a voice.

The microphone 170C, also referred to as a "mike" or a "mic", is configured to convert a sound signal into an electrical signal. When making a call or sending voice information, a user may make a sound by moving a human mouth close to the microphone 170C to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

In some embodiments, the microphone 170C may further collect a voice instruction from a user, so that the electronic device 100 performs a response operation according to the voice instruction from the user.

The headset jack 170D is configured to connect to a wired headset. The headset jack 170D may be a USB port 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor.

The gyroscope sensor 180B may be configured to determine a motion posture of the electronic device 100. In some embodiments, an angular velocity of the electronic device 100 around three axes (namely, axes X, Y, and Z) may be determined by using the gyroscope sensor 180B. The gyroscope sensor 180B may be configured to implement image stabilization during photographing.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall effect sensor. The electronic device 100 may detect opening and closing of a flip cover by using the magnetic sensor 180D. In some embodiments, when the electronic device 100 is a clamshell phone, the electronic device 100 may detect opening and closing of a flip cover by using the magnetic sensor 180D. Further, a feature such as automatic unlocking upon opening of the flip cover is set based on a detected opening or closing state of the leather case or a detected opening or closing state of the flip cover.

The acceleration sensor 180E may detect accelerations in various directions (usually on three axes) of the electronic device 100, and may detect magnitude and a direction of gravity when the electronic device 100 is still. The acceleration sensor may be further configured to recognize a posture of the electronic device, and is used in screen switching between a landscape mode and a portrait mode, a pedometer, or another application.

The distance sensor 180F is configured to measure a distance. The electronic device 100 may measure the distance in an infrared or a laser manner. In some embodiments, in a photographing scenario, the electronic device 100 may measure a distance by using the distance sensor 180F, to implement quick focusing.

The optical proximity sensor 180G may include, for example, a light-emitting diode (LED) and an optical detector such as a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that a user holds the electronic device 100 close to an ear for a call, to automatically turn off a screen for power saving. The optical proximity sensor 180G may also be used in a leather case mode or a pocket mode to automatically unlock or lock the screen.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor located near the temperature sensor 180J, to reduce power consumption to implement thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142, to avoid abnormal shutdown due to a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. Visual output related to the touch operation may be provided on the display 194. In some other embodiments, the touch sensor 180K may alternatively be disposed on a surface of the electronic device 100 at a location different from a location of the display 194.

The bone conduction sensor 180M may obtain a vibration signal. In some embodiments, the bone conduction sensor 180M may obtain a vibration signal of a vibration bone of a human vocal part. The bone conduction sensor 180M may also be in contact with a human pulse, and receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to a user setting and function control of the electronic device 100. The electronic device 100 may perform a response operation based on a button input of a user.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator, and may be configured to indicate a charging status and a power change, or may be configured to indicate a message, a missed call, a notification, and the like.

The SIM card interface 195 is used to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type or different types. The SIM card interface 195 is applicable to different types of SIM cards. The SIM card interface 195 is also applicable to an external storage card. The electronic device 100 interacts with a network through the SIM card, to implement functions such as calling and data communication. In some embodiments, the electronic device 100 uses an eSIM, namely, an embedded SIM card. The eSIM card may be embedded into the electronic device 100, and cannot be separated from the electronic device 100.

It may be understood that the structure shown in this embodiment of this application does not constitute a specific limitation on the electronic device 100. In some other embodiments of this application, the electronic device 100 may include more or fewer components than those shown in the figure, combine some components, split some components, or have different component arrangements. The components shown in the figure may be implemented by using hardware, software, or a combination of software and hardware.

For example, when the electronic device 100 is a television, the electronic device 100 may include a component such as a display or a GPU, but does not include a component such as a mobile communications module. When the electronic device 100 is a sound box, the electronic device may include a component such as an audio module, but does not include a component such as a display or a GPU.

In this embodiment of this application, if the electronic device 100 is a primary device, the processor 110 may execute code in the internal memory 121, to measure time consumption t for transmission (namely, a network transmission time period) between the electronic device 100 and different secondary devices, and determine maximum time consumption max between the electronic device 100 and the different secondary devices.

In a technical solution, if the electronic device 100 is a primary device, the processor 110 may further execute code in the internal memory 121, to make a response after duration of max, and separately send the maximum time consumption max for transmission and different time consumption t for transmission between the secondary devices and the electronic device 100 to the corresponding secondary devices. If the electronic device 100 is a secondary device, the processor 110 may execute code in the internal memory 121, to make a response after duration of max−ti after max and time consumption t for transmission are received, where ti indicates the time consumption t for transmission between the current secondary device and a primary device. In this way, the primary device and secondary devices can simultaneously make a response.

In another technical solution, if the electronic device 100 is a primary device, the processor 110 may execute code in the internal memory 121, to make a response after duration of max, and instruct a corresponding secondary device to make a response after duration of max−ti, where ti indicates time consumption t for transmission between the primary device and the secondary device that is instructed to make a response. Time consumption ti for transmission varies with secondary devices. If the electronic device 100 is a secondary device, the processor 110 may execute code in the internal memory 121, to immediately make a response after a response instruction sent by the primary device is received. In this way, the primary device and secondary devices can simultaneously make a response.

The following describes a simultaneous response method provided in the embodiments of this application by using examples in different application scenarios.

In an application scenario, a group of electronic devices are a group of audio devices. The group of audio devices may receive a voice instruction from a user. For example, the group of audio devices may be a group of sound boxes, a group of headsets, or a group of other audio devices.

Figure 5:
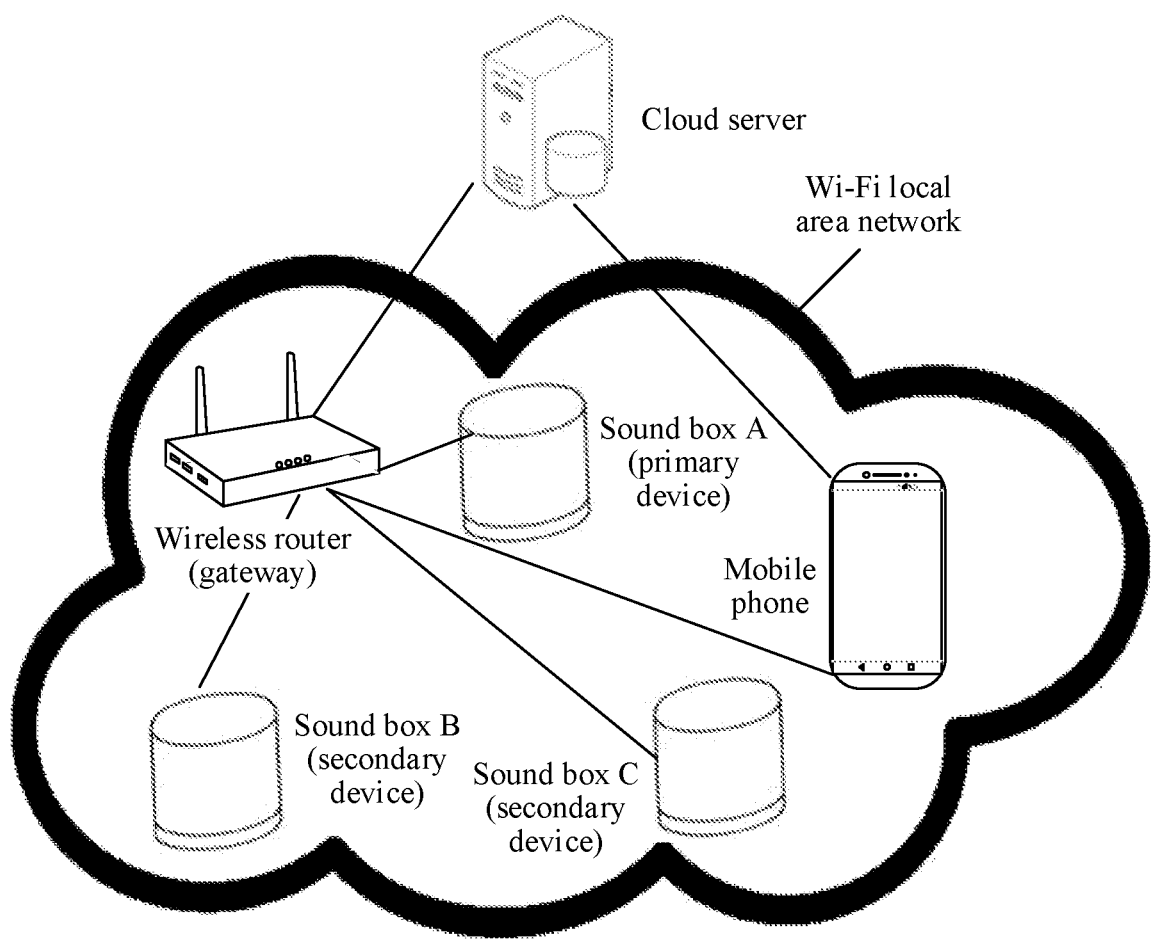
FIG. 5 is a schematic diagram of a simultaneous response scenario according to an embodiment of this application.

For example, as shown in FIG. 5, the group of audio devices include a sound box A disposed in a living room, and a sound box B and a sound box C that are disposed in different bedrooms. The sound box A, the sound box B, and the sound box C may access a same Wi-Fi local area network by using a wireless router (or referred to as a wireless access point). The wireless router is a gateway. It should be noted that there may be one or more wireless routers (for example, including a primary router and a secondary router).

The sound box A, the sound box B, and the sound box C may be paired to form a group of electronic devices. The group of electronic devices may be paired in a plurality of manners. For example, in some embodiments, the group of electronic devices are a group of electronic devices that are pre-paired before delivery. For example, the group of electronic devices are a group of a left-channel sound box and a right-channel sound box that are paired before delivery.

Figure 6A:
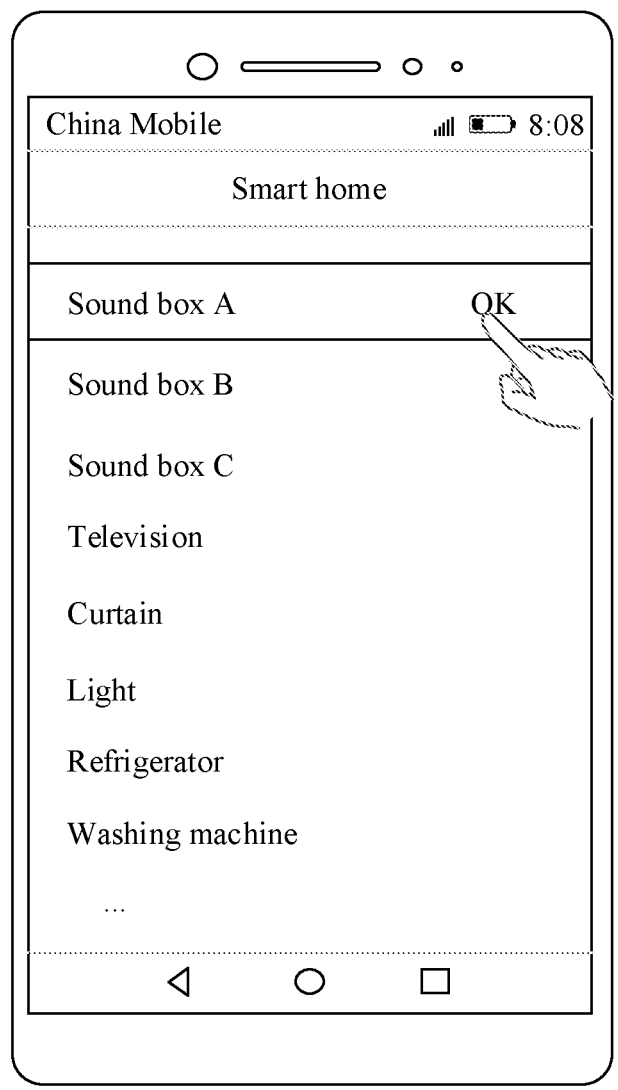
FIG. 6A and FIG. 6B are schematic diagrams of a group of pairing interfaces according to an embodiment of this application.
Figure 6B:
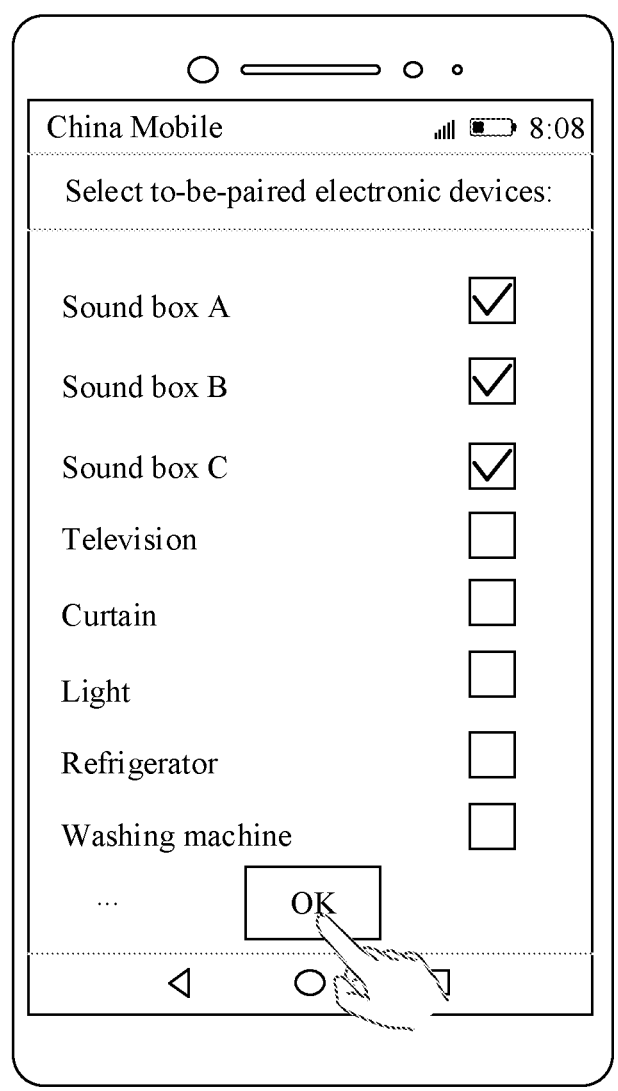

For another example, in some other embodiments, the sound box A, the sound box B, the sound box C, and a mobile phone of the user may access the same WI-FI local area network by using the wireless router. For example, as shown in FIG. 6A and FIG. 6B, the user may pair the sound box A, the sound box B, and the sound box C by using an app on the mobile phone, to combine the sound box A, the sound box B, and the sound box C into a group of electronic devices.

After the mobile phone detects, by using the app, an indication operation that the user indicates to pair the sound box A, the sound box B, and the sound box C, the mobile phone may separately notify, by using a cloud server, the sound box A, the sound box B, and the sound box C to perform pairing. The sound box A may send pairing-related information to the cloud server by using the wireless router, and the cloud server forwards the pairing-related information to the to-be-paired sound box B and the to-be-paired sound box C by using the wireless router. For example, the pairing-related information may include an IP address, a device identifier (for example, a serial number), a device name, a device model, or pairing response information. Likewise, the sound box C and the sound box B may also forward the pairing-related information to another to-be-paired sound box by using the wireless router and the cloud server. In this way, the pairing-related information may be exchanged between the sound box A, the sound box B, and the sound box C, and a pairing process is completed.

In the group of electronic devices, roles of a primary device and secondary devices may be specified by the user. For example, the user may specify, by using the app, that the sound box A is a primary device, and the sound box B and the sound box C are secondary devices.

Alternatively, in the group of electronic devices, roles of a primary device and secondary devices may be automatically determined by the mobile phone. For example, the mobile phone determines that, in the group of electronic devices, a sound box that first accesses the Wi-Fi local area network is the primary device, and other sound boxes are the secondary devices. For another example, the mobile phone randomly selects one sound box in the group of electronic devices as a primary device and other sound boxes as secondary devices. For another example, different sound boxes in the group of electronic devices may each determine a distance to the user by using a component such as an infrared sensor or a distance sensor, and report the distance to the mobile phone. The mobile phone determines a sound box closest to the user as the primary device. For another example, different sound boxes in the group of electronic devices may each detect a parameter such as strength of a voice signal from the user, and report the parameter such as the strength of the voice signal to the mobile phone. The mobile phone determines a distance between each sound box and the user based on the parameter such as the strength of the voice signal, and determines a sound box closest to the user as the primary device.

After the roles of the primary device and the secondary devices are determined, the mobile phone may separately notify the roles of the primary device and the secondary devices to the sound box A, the sound box B, and the sound box C by using the cloud server and the wireless router. Alternatively, the primary device and the secondary devices may notify each other of the roles of the primary device and the secondary devices.

After pairing, the group of electronic devices may measure time consumption t for transmission between the primary device and the secondary devices. In the conventional technology, transmission time periods between a clock source site and the group of electronic devices may be long because the clock source site is far away from the group of electronic devices. Compared with this, the time consumption t for transmission between the primary device and the secondary devices is shorter because distances between the primary device and the secondary devices that access the same local area network are relatively short.

In some embodiments, the secondary devices may each measure time consumption t for transmission between the secondary devices and the primary device, and report the time consumption t for transmission to the primary device for storage. The time consumption t for transmission is a time period consumed for transmitting information between the primary device and the secondary device. The primary device may determine a maximum value max of time consumption t for transmission (namely, maximum time consumption t for transmission) between the primary device and the secondary devices.

In some other embodiments, the primary device may separately measure time consumption t for transmission between the primary device and the secondary devices, and determine a maximum value max of the time consumption t for transmission between the primary device and the secondary devices.

There may be a plurality of methods for measuring the time consumption t for transmission by the primary device or the secondary device. For example, the sound box A measures time consumption t for transmission between the sound box A and the sound box B. The sound box A may send measurement information to the sound box B and record a sending moment. The sound box B receives the measurement information sent by the sound box A and may record a receiving moment. The sound box B sends response information to the primary device, to return the receiving moment to the sound box A. The sound box A determines a difference between the receiving moment and the sending moment, namely, the time consumption t for transmission between the sound box A and the sound box B. For another example, when the sound box A measures time consumption t for transmission between the sound box A and a sound box B, the sound box A may send measurement information to the sound box B, and start a timer. The sound box B receives the measurement information sent by the sound box A and returns response information to the sound box A. After receiving the response information, the sound box A stops the timer, and determines that half of timing duration of the timer is the time consumption t for transmission between the sound box A and the sound box B.

The time consumption t for transmission between the sound box A and the sound box B may be the same as or different from time consumption t for transmission between the sound box A and the sound box C. For example, the time consumption t for transmission between the sound box A and the sound box B is ab (which may be, for example, 12 ms), and the time consumption t for transmission between the sound box A and the sound box C is ac. If ac is greater than ab, max=ac.

In this way, during pairing, the group of electronic devices may exchange the pairing-related information. After pairing, the group of electronic devices may further exchange other information, such as measurement information and response information that are used to measure the time consumption t for transmission between the primary device and the secondary devices.

In addition, when the group of electronic devices are disconnected from the network, for example, when the group of electronic devices are powered on/off, an access point for the group of electronic devices is changed, reset, or powered on/off, or a name or a password of the local area network accessed by the group of electronic devices is changed, the time consumption t for transmission may also change. Therefore, after re-accessing the local area network, the group of electronic devices may further re-measure time consumption t for transmission between the primary device and the secondary devices, and re-determine maximum time consumption max for transmission.

In some embodiments, the group of electronic devices may receive a voice instruction from the user, and simultaneously make a response according to the voice instruction from the user. For example, the group of electronic devices may receive an instruction from the user to instruct to turn on a light, and simultaneously perform an operation of turning on the light (namely, simultaneously make a response, or simultaneously perform a response operation). For another example, the group of electronic devices may receive a voice wake-up instruction from the user, and simultaneously perform wake-up answering (that is, simultaneously make a response). The wake-up answering may include a plurality of manners, for example, turning on a light (for example, turning on a light ring, turning on an indicator, blinking an indicator), making a sound (for example, a sound "beep" or a sound "The system is woken up"), or vibration.

The following provides descriptions by using an example in which the sound box A is the primary device, the sound box B and the sound box C are the secondary devices, and after receiving the voice wake-up indication (that is, detecting the response indication) from the user, the group of electronic devices simultaneously turns on light rings to perform the wake-up answering based on the scenario shown in FIG. 5.

In this embodiment of this application, the primary device and the secondary devices may exchange data information (for example, a data instruction) through forwarding of the gateway (for example, the wireless router). Alternatively, the primary device and the secondary devices may exchange data information through forwarding of the cloud server and the gateway.

Generally, the cloud server has a relatively strong processing capability, can better identify voice information from the user, and identify a user intention based on the voice information from the user. Therefore, the primary device and the secondary devices may further process the voice information through processing of the cloud server and forwarding of the gateway. For example, the secondary devices may receive the voice information from the user, and report the voice information to the cloud server through the gateway. After identifying and processing the voice information, the cloud server learns the user intention, converts the user intention into a corresponding data instruction, and sends the data instruction to the primary device through the gateway. Alternatively, the primary device and the secondary devices may exchange the voice information through forwarding of the gateway.

In one case, the voice wake-up instruction is a specific voice instruction. For example, the voice wake-up instruction may be "Xiao E Xiao E!". After detecting the voice wake-up instruction, the sound boxes A to C determine that the user wants to wake up the sound boxes. For example, after detecting the voice wake-up instruction from the user, the sound box A (namely, the primary device) determines that the user wants to wake up the sound box. The sound box A may control the sound box A, the sound box B, and the sound box C to simultaneously turn on light rings (that is, simultaneously make a response). Alternatively, after detecting the voice wake-up instruction, the sound box B or the sound box C (namely, the secondary device) determines that the user wants to wake up the sound box, and may send a corresponding data instruction to the sound box A (that is, forward the corresponding data instruction to the sound box A by using the wireless router), so that the sound box A learns that the user wants to wake up the sound box. In this method, the instruction information is not forwarded by using the cloud server, and therefore the sound boxes can be woken up as soon as possible.

In another case, after detecting the voice wake-up instruction from the user, the sound box B or the sound box C may notify the sound box A by using the cloud server (that is, notify the sound box A through forwarding of the wireless router after voice intention processing of the cloud server). The sound box A may control the sound box A, the sound box B, and the sound box C to synchronously turn on light rings.

Figure 7:
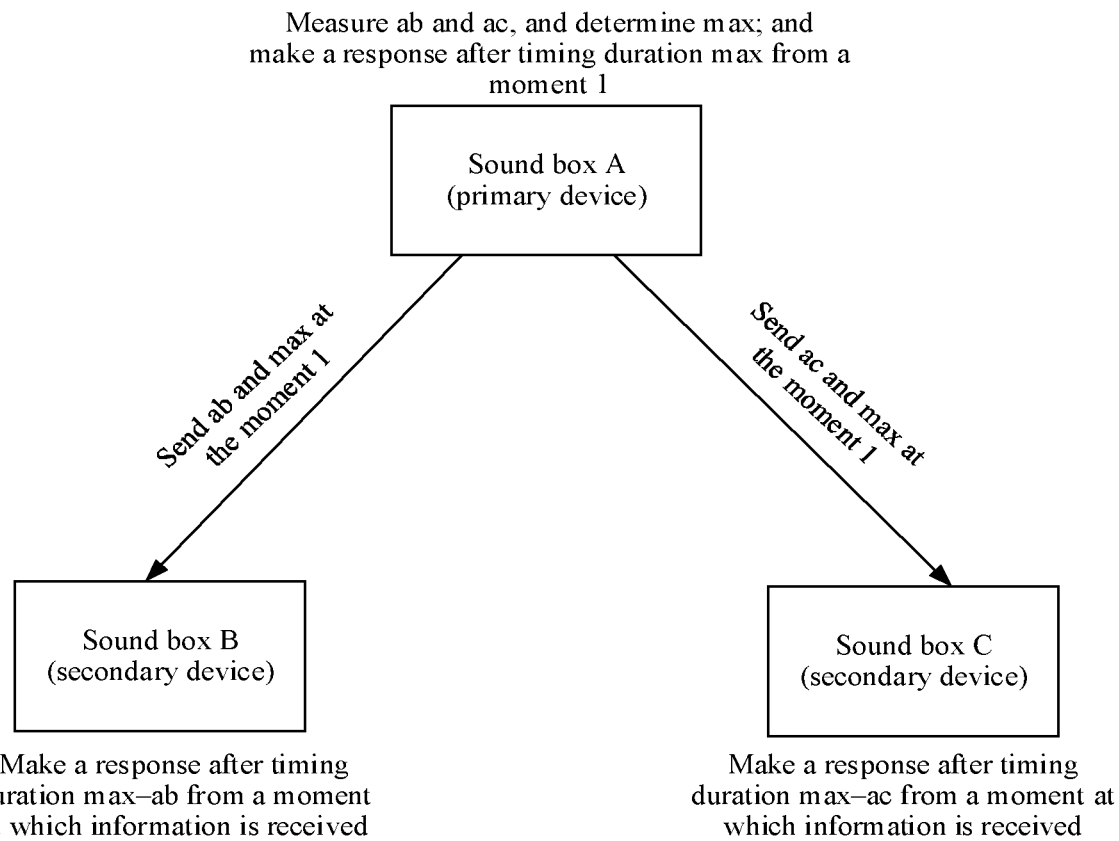
FIG. 7 is a schematic diagram of a simultaneous response principle according to an embodiment of this application.

In some embodiments, as shown in FIG. 7, the sound box A may detect the voice wake-up instruction from the user, or learn a wake-up indication from the user based on a notification from the secondary device or the cloud server. If the time consumption ab for transmission and ac are obtained by the sound box A through measurement, and a current moment is a moment 1, the sound box A may send a response instruction 1 to the sound box B, where the response instruction 1 includes the time consumption ab for transmission and the maximum time consumption max for transmission. ab and max that are sent by the sound box A arrive at the sound box B after the time consumption ab for transmission. That is, the sound box B receives, at a moment 1+ab, ab and max that are sent by the sound box A. After receiving ab and max, the sound box B sets a timer whose duration is max−ab, and performs response after the duration max−ab. That is, the sound box B performs response at a moment indicated by moment 1+ab+(max−ab)=moment 1+max.

Likewise, the sound box A may send a response instruction 2 to the sound box C, where the response instruction 2 includes the time consumption ac for transmission and the maximum time consumption max for transmission. ac and max that are sent by the sound box A arrive at the sound box C after the time consumption ac for transmission. That is, the sound box C receives, at a moment 1+ac, ac and max that are sent by the sound box A. After receiving ac and max, the sound box C sets a timer whose duration is max−ac, and performs response after the duration max−ac. That is, the sound box C performs response at a moment indicated by moment 1+ac+(max−ac)=moment 1+max.

Figure 9:
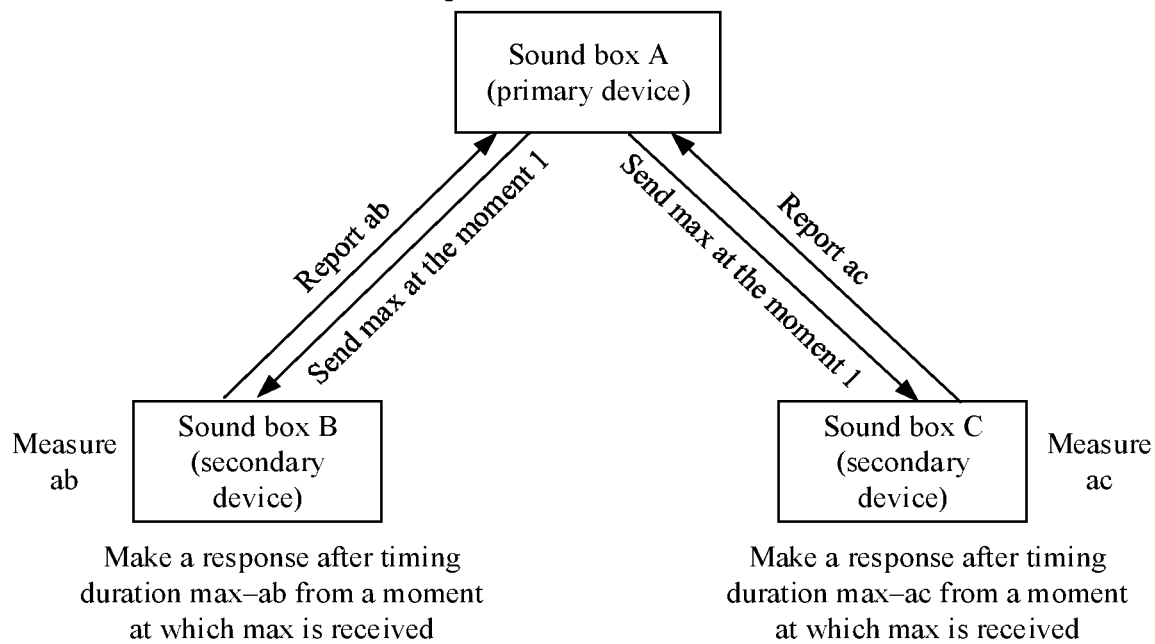
FIG. 9 is a schematic diagram of another simultaneous response principle according to an embodiment of this application.
Figure 10A:
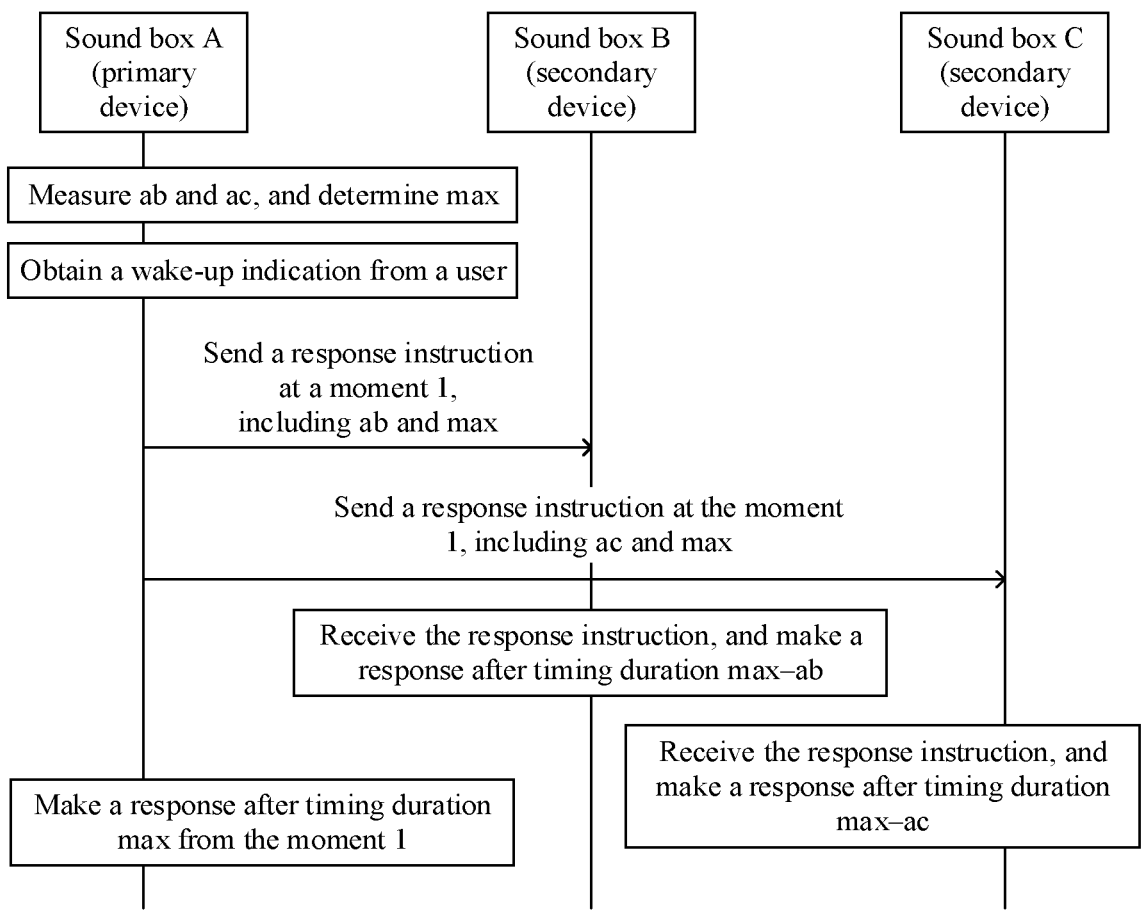
FIG. 10A is a simultaneous response flowchart according to an embodiment of this application.
Figure 10B:
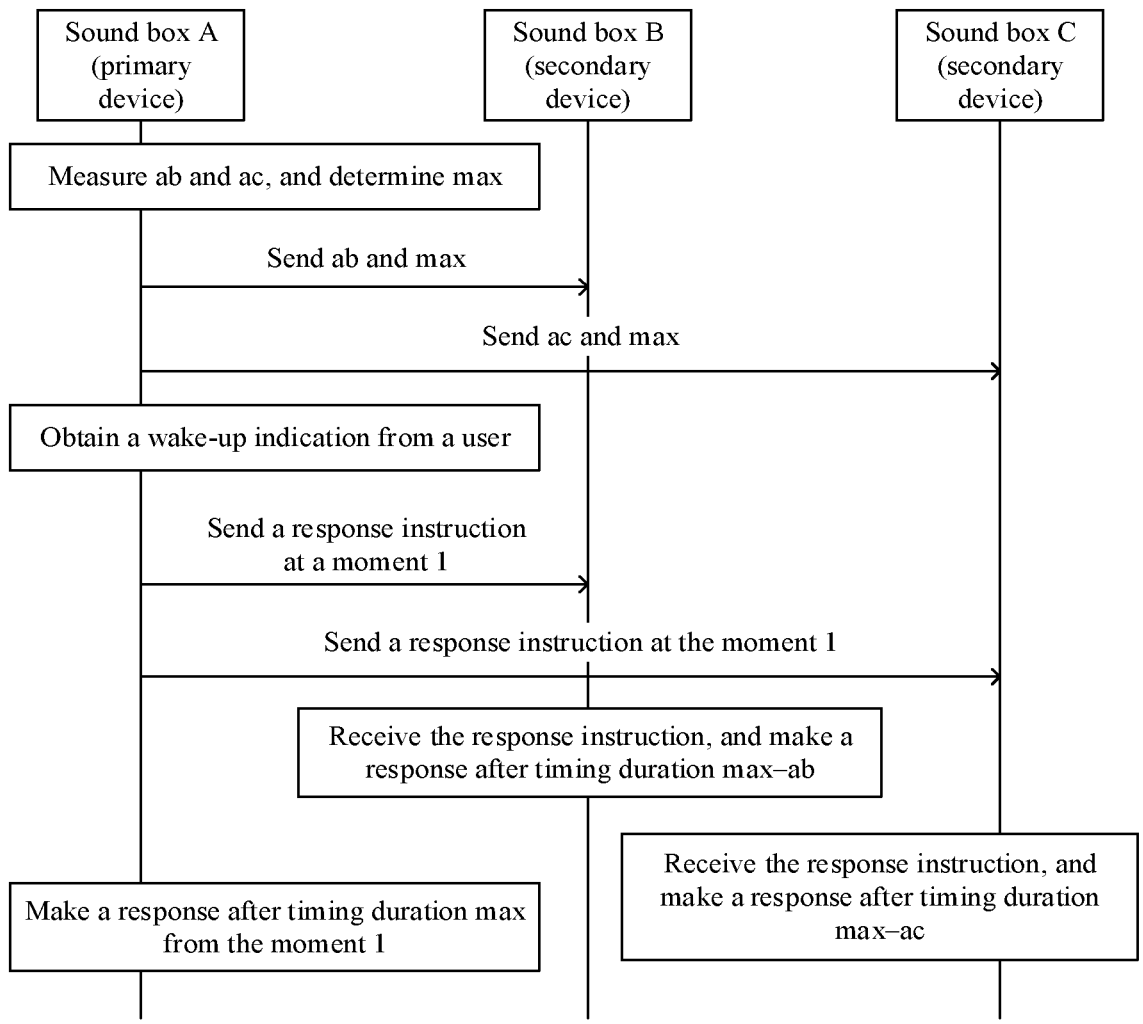
FIG. 10B is another simultaneous response flowchart according to an embodiment of this application.

It should be noted that, in FIG. 7 and the following FIG. 9 to FIG. 10B, after learning the wake-up indication from the user, the sound box A may separately send a response instruction to the sound box B and the sound box C. In other words, there is no sequence between sending a response instruction to the sound box B by the sound box A and sending a response instruction to the sound box C by the sound box A.

It should be further noted that, in FIG. 7 and the following FIG. 9 to FIG. 13, information exchange between the sound box A, the sound box B, and the sound box C is exchange of response instructions, max, ab, ac, or the like. The information is forwarded from one sound box to another by using the wireless router, but not sent directly from one sound box to another.

In addition, the sound box A performs response at a moment indicated by moment 1+max.

It can be learned that the sound box A, the sound box B, and the sound box C all simultaneously make a response at the moment indicated by moment 1+max. If max=ac, the sound box A, the sound box B, and the sound box C all simultaneously make a response at a moment indicated by moment 1+ac. If max=ab, the sound box A, the sound box B, and the sound box C all simultaneously make a response at a moment indicated by moment 1+ab.

Figure 8A:
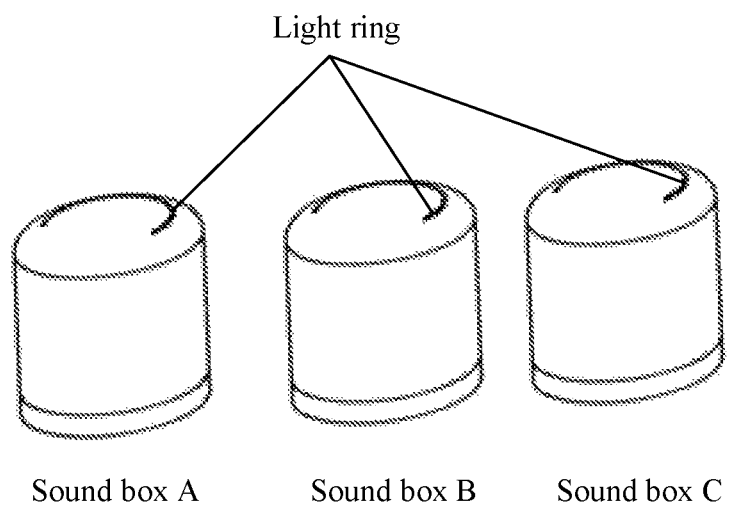
FIG. 8A is a schematic diagram of a simultaneous response effect according to an embodiment of this application.

For example, if the wake-up answering is turning on a light ring, the sound box A, the sound box B, and the sound box C simultaneously turn on light rings at the moment indicated by moment 1+max. As shown in FIG. 8A, processes of turning on light rings by sound boxes may be synchronized.

Figure 8B:
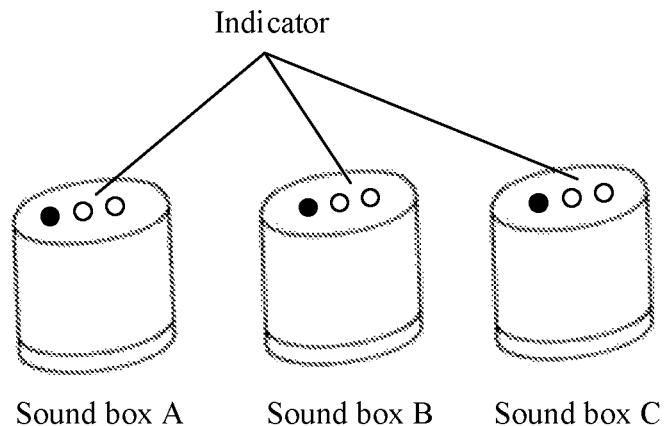
FIG. 8B is a schematic diagram of another simultaneous response effect according to an embodiment of this application.

For another example, if the wake-up answering is turning on one or more indicators, the sound box A, the sound box B, and the sound box C simultaneously turn on the indicator at the moment indicated by moment 1+max. As shown in FIG. 8B, sound boxes may synchronously turn on a row of indicators.

For another example, if the wake-up answering is blinking an indicator or the like, the sound box A, the sound box B, and the sound box C simultaneously start to blink indicators at a same frequency, and the like at the moment indicated by moment 1+max.

For another example, if the wake-up answering is a sound "beep", the sound box A, the sound box B, and the sound box C simultaneously make the sound "beep" at the moment indicated by moment 1+max.

For another example, if the wake-up answering is making a sound "The system is woken up", the sound box A, the sound box B, and the sound box C simultaneously make the sound "The system is woken up" at the moment indicated by moment 1+max.

In the solution shown in FIG. 7, although there is the time consumption ab and ac for transmission between the primary device and the secondary devices in the local area network, the time consumption t for transmission is considered and offset when the secondary device side performs simultaneous response. This avoids a simultaneous response error caused by the time consumption t for transmission, and improves simultaneous response consistency.

Figure 1:
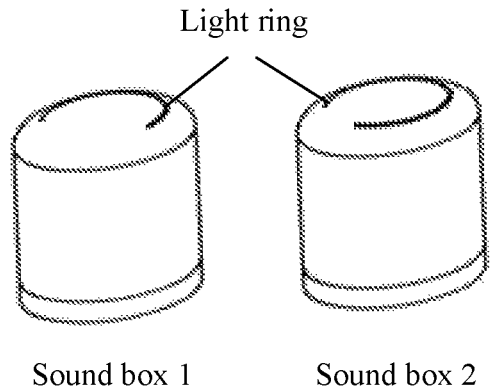
FIG. 1 is a schematic diagram of a simultaneous response effect in the conventional technology.

Because the simultaneous response consistency between the primary device and the secondary devices is relatively high, the sound box A, the sound box B, and the sound box C may simultaneously perform the wake-up answering, for example, simultaneously start to turn on the light rings. In addition, compared with light ring turning-on processes in the conventional technology shown in FIG. 1, the light ring turning-on processes of the sound box A, the sound box B, and the sound box C have better synchronization and better visual user experience.

If the sound box B and the sound box C measure the time consumption ab and ac for transmission respectively and report the time consumption t for transmission to the sound box A, and a current moment is a moment 1, as shown in FIG. 9, the sound box A sends maximum time consumption max for transmission to the sound box B and the sound box C by using a response instruction, instead of sending both ab and ac. max sent by the sound box A arrives at the sound box B after the time consumption ab for transmission. That is, the sound box B receives, at a moment 1+ab, max sent by the sound box A. After receiving max, the sound box B sets a timer whose duration is max−ab, and performs response after the duration max−ab. That is, the sound box B performs response at a moment indicated by moment 1+ab+(max−ab)=moment 1+max.

Likewise, max sent by the sound box A arrives at the sound box C after the time consumption ac for transmission. That is, the sound box C receives, at a moment 1+ac, max sent by the sound box A. After receiving max, the sound box C sets a timer whose duration is max−ac, and performs response after the duration max−ac. That is, the sound box C performs response at a moment indicated by moment 1+ac+(max−ac)=moment 1+max.

In addition, the sound box A performs response at a moment indicated by moment 1+max.

In the solutions shown in FIG. 7 and FIG. 9, the sound box A performs response after the duration max from the current moment, the sound box B performs response after the duration max−ab after max sent by the sound box A is received, and the sound box C performs response after the duration max−ac after max sent by the sound box A is received. max, max−ab, and max−ac each are a relative time period, that is, each sound box performs simultaneous response based on the relative time period, and the time consumption t for transmission between the primary device and the secondary devices in the local area network is considered and offset. In addition, there is no need to obtain standard time (namely, absolute time) through network clock synchronization. This can avoid a delay caused by network clock synchronization, improve simultaneous response consistency between the primary device and the secondary devices, and improve user experience. For example, if the solution shown in FIG. 7 is used, simultaneous response time errors of the different sound boxes can be reduced to be less than 0.01 ms.

The solution described above is mainly as follows: After determining that response is required (or after detecting the response indication, for example, after learning the wake-up indication from the user), the primary device sends the response instruction to the secondary devices, and sends max, ab, and ac to the secondary devices, or send max to the secondary devices, to perform simultaneous response. For example, for a method flowchart of the solution shown in FIG. 7, refer to FIG. 10A.

In some other technical solutions, as shown in FIG. 10B, a primary device may send max, ab, and ac to secondary devices in advance, or send max to secondary devices in advance. For example, after pairing, the primary device sends max, ab, and ac to corresponding secondary devices in advance, or sends max to secondary devices in advance. Then, after determining that response is required (for example, learning a wake-up indication from a user), the primary device sends response instructions to the secondary devices at the moments shown in FIG. 7, where the response instructions may not include max−ab or max−ac, so that the primary device and the secondary devices perform simultaneous response.

Figure 11:
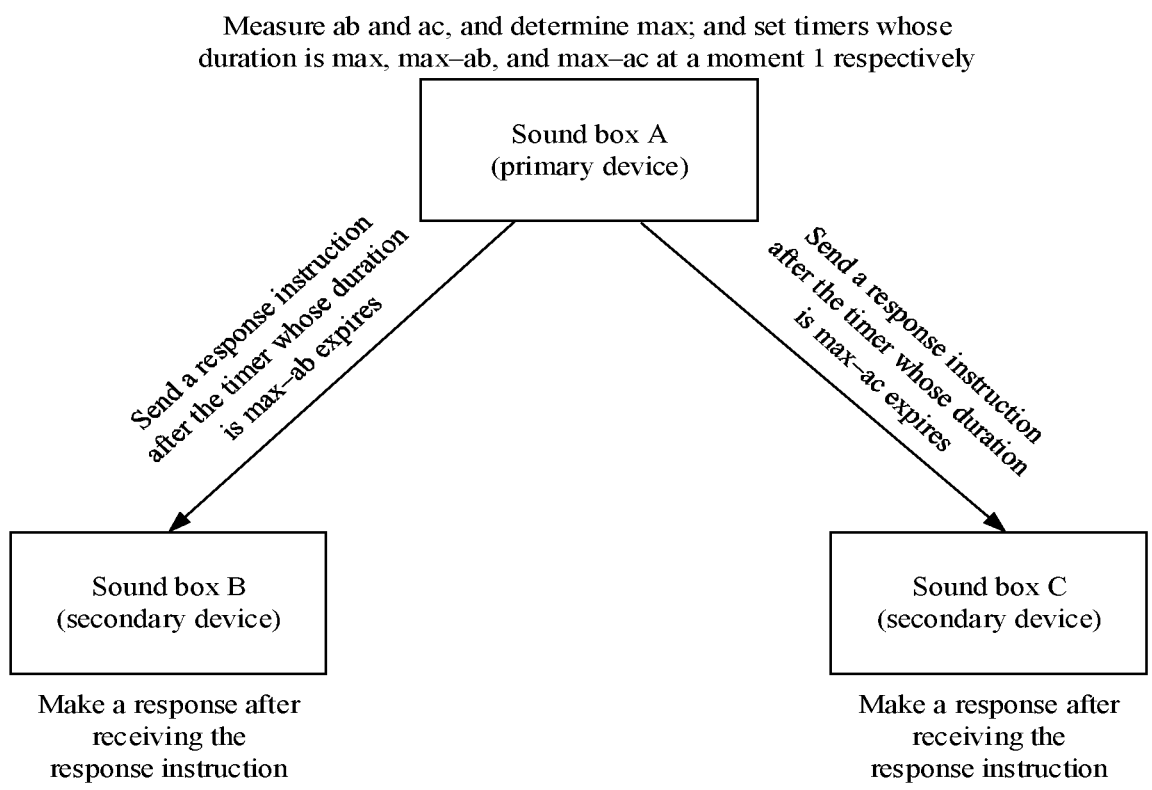
FIG. 11 is a schematic diagram of another simultaneous response principle according to an embodiment of this application.
Figure 12:
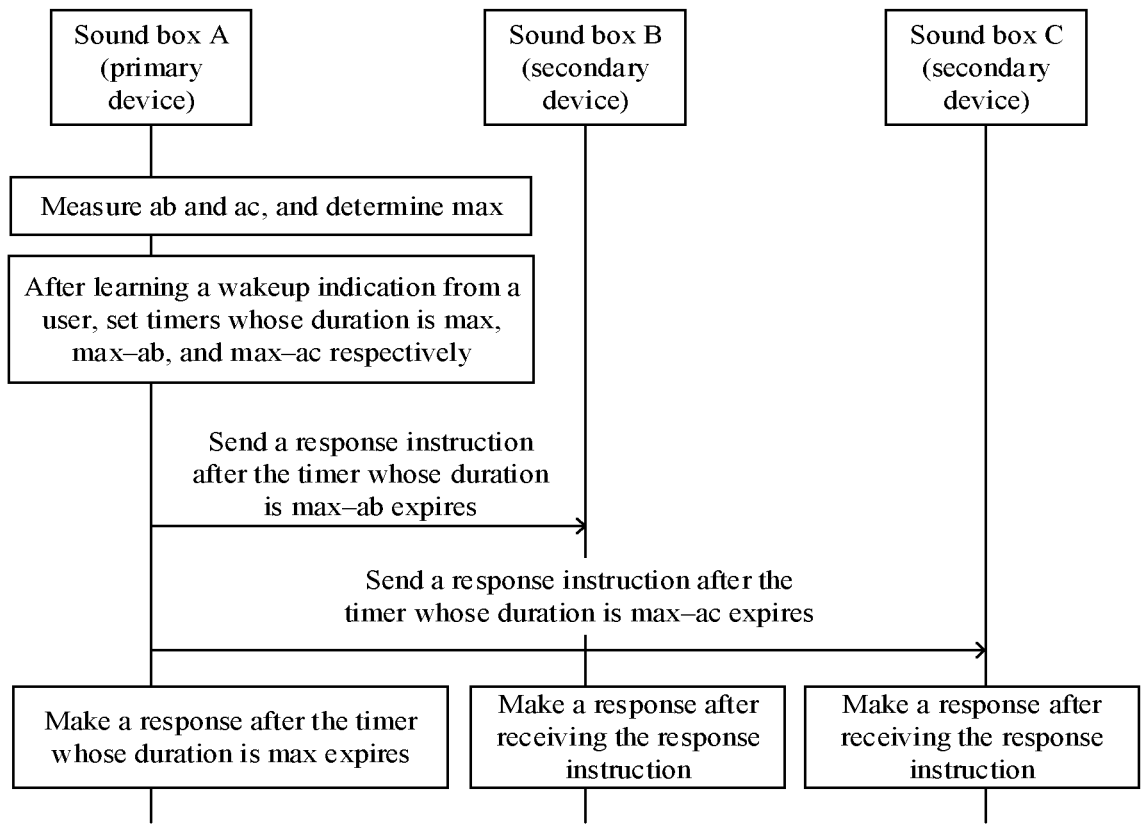
FIG. 12 is another simultaneous response flowchart according to an embodiment of this application.

It can be learned from the foregoing descriptions that the sound box A may measure the time consumption ab and ac for transmission between the primary device and the secondary devices, or the sound box B and the sound box C may respectively measure the time consumption ab and ac for transmission; and then the primary device may determine max based on ab and ac. In some embodiments, after the sound box A learns the wake-up indication from the user through detection of the sound box A or the notification from the secondary device or the cloud server, as shown in FIG. 11 and FIG. 12, if a current moment is a moment 1, the sound box A may set timers whose duration is max, max−ab, and max−ac respectively. After the timer whose duration is max−ab expires, that is, at a moment indicated by moment 1+max−ab, the sound box A sends an instruction to the sound box B, to instruct the sound box B to make a response. The instruction arrives at the sound box B after time consumption ab for transmission. That is, the sound box B receives the instruction at a moment indicated by moment 1+max−ab+ab=moment 1+max. The sound box B performs response after receiving the instruction. That is, the sound box B performs response at a moment indicated by moment 1+max.

It can be learned that although there is the time consumption ab for transmission between the sound box A and the sound box B, the time consumption t for transmission is considered and offset at a sound box A side. This avoids a simultaneous response error caused by the time consumption t for transmission.

After the timer whose duration is max−ac expires, that is, at a moment indicated by moment 1+max−ac, the sound box A sends an instruction to the sound box C, to instruct the sound box C to make a response. The instruction arrives at the sound box C after time consumption ac for transmission. That is, the sound box C receives the instruction at a moment indicated by moment 1+max−ac+ac=moment 1+max. The sound box C performs response after receiving the instruction. That is, the sound box C performs response at a moment indicated by moment 1+max.

It can be learned that although there is the time consumption ac for transmission between the sound box A and the sound box C, the time consumption t for transmission is considered and offset at a sound box A side. This avoids a simultaneous response error caused by the time consumption t for transmission.

After the timer whose duration is max expires, that is, at the moment indicated by moment 1+max, the sound box A performs response.

In other words, the sound box A, the sound box B, and the sound box C all simultaneously make a response at the moment indicated by moment 1+max.

In the solutions shown in FIG. 11 and FIG. 12, the sound box A performs response after the duration max from the current moment, instructs the sound box B to make a response after the duration max−ab from the current moment, and instructs the sound box C to make a response after the duration max−ac from the current moment. max, max−ab, and max−ac each are a relative time period, that is, each sound box performs simultaneous response based on the relative time period, and the time consumption t for transmission between the primary device and the secondary devices in the local area network is considered and offset. In addition, there is no need to obtain standard time (namely, absolute time) through network clock synchronization. This can avoid a delay caused by network clock synchronization, improve simultaneous response consistency between the primary device and the secondary devices, and improve user experience.

In addition, compared with the solutions shown in FIG. 7 to FIG. 10B, the solutions shown in FIG. 11 and FIG. 12 are as follows: The primary device (the sound box A) calculates timing duration and sets a plurality of timers. Devices for calculating the timing duration are a same device, and the plurality of timers are implemented based on physical clock timers of the same device. There is no need to separately calculate duration of timers by different devices and set the timers on the different devices, and this can further avoid errors of time consumption for calculation of the devices and timer errors of the different devices. This can reduce simultaneous response errors of the group of electronic devices, improve simultaneous response consistency, and improve user experience. For example, if the solutions shown in FIG. 11 and FIG. 12 is used, simultaneous response time errors of the different sound boxes can be reduced to be less than 0.001 ms.

In addition, it should be noted that, compared with the solution in which the different secondary devices (namely, the sound box B and the sound box C) separately measure the time consumption t for transmission between the primary device (namely, the sound box A) and the different secondary devices, the solutions shown in FIG. 11 and FIG. 12 are as follows: The primary device measures the time consumption t for transmission between the primary device and the different secondary devices. This can ensure that the same primary device serves as an execution body in a measurement process, avoid measurement errors caused because the different electronic devices separately measure the time consumption t for transmission, and improve measurement precision.

In some other embodiments, max may be replaced with T=max+T0, where T0 is greater than or equal to 0, that is, T is greater than or equal to max. When T0 is 0, the primary device and the secondary devices may simultaneously make a response at the same moment as soon as possible. Therefore, user experience is better.

In some other embodiments, the group of electronic devices may further receive another voice instruction from the user other than the voice wake-up instruction, and perform simultaneous response. For example, the another voice instruction from the user is a voice instruction of setting an alarm clock whose ring time is 8:00 a.m. the next morning for the user.

Because the another voice instruction from the user other than the voice wake-up instruction is usually not a specific instruction, and is personalized and random. Different users usually deliver different voice instructions for a same indication. The cloud server has a relatively strong voice intention processing capability. Therefore, when detecting the another voice instruction from the user other than the voice wake-up instruction, the primary device or the secondary devices usually needs to report the another voice instruction to the cloud server by using the wireless router. The cloud server processes and converts the another voice instruction into the corresponding data instruction, and then sends the data instruction to the primary device through forwarding of the wireless router. The primary device controls the secondary devices to simultaneously make responses.

For example, the primary device (the sound box A) detects a voice instruction of setting an alarm clock whose ring time is 8:00 a.m. the next morning for the user. The sound box A, the sound box B, and the sound box C may simultaneously start an alarm ringtone at 8:00 a.m. the next morning by using the simultaneous response methods shown in FIG. 7 to FIG. 12. For another example, the secondary device (the sound box B) detects a voice instruction of setting an alarm clock whose ring time is 8:00 a.m. the next morning for the user. The sound box B notifies, by using the wireless router and the cloud server, the sound box A of the alarm clock setting. The sound box A, the sound box B, and the sound box C may simultaneously start an alarm ringtone at 8:00 a.m. the next morning by using the simultaneous response methods shown in FIG. 7 to FIG. 12.

For another example, the group of electronic devices receive a voice control instruction from the user for instructing to play a song, pause a song, play a previous song/next song, increase volume, decrease volume, or the like. The group of electronic devices may perform simultaneous response by using the methods shown in FIG. 7 to FIG. 12.

In addition, the user may further instruct, by using a mobile phone app or in a manner such as a voice instruction, a button operation, or a touch operation, the group of electronic devices to perform control operations such as playing a song, pausing a song, playing a previous song/next song, increasing volume, and decreasing volume. The app notifies the primary device by using the cloud server. It should be noted that the cloud server may specifically forward the related instruction to the primary device by using the wireless router. The primary device and the secondary devices may perform simultaneous response by using the methods shown in FIG. 7 to FIG. 12, to simultaneously start playing a song, simultaneously pause a song, simultaneously switch to a previous song/next song, simultaneously increase volume, simultaneously decrease volume, and the like.

In addition, the secondary devices may further detect an indication such as a button operation or a touch operation from the user, and notify the primary device. It should be noted that the secondary devices may specifically forward the related instruction to the primary device by using the wireless router. For example, after detecting an indication corresponding to a button operation from the user for indicating to play a next song, the secondary devices notify the primary device. The primary device and the secondary devices may perform simultaneous response by using the methods shown in FIG. 7 to FIG. 12, to simultaneously switch to playing the next song.

It should be noted that the foregoing provides descriptions by mainly using an example in which the secondary devices include two devices. In some other embodiments, there may be further two more secondary devices, and max is a maximum value of time consumption t for transmission between the second devices and the primary device.

In some other embodiments, there may be one secondary device, and max is time consumption t for transmission between the primary device and the secondary device. For example, the primary device is the sound box A, the secondary device is the sound box B, and max is the time consumption ab for transmission that is measured by the primary device and that is between the primary device and the secondary device. After detecting a response indication, the sound box A performs response after duration T=ab+T0 in response to the response indication, where T0 is greater than or equal to 0, in other words, T is greater than or equal to ab. For example, that the sound box A detects a response indication may be: The sound box A detects an indication such as a voice instruction, a button operation, or a touch operation from the user, receives an instruction sent by the cloud server or the secondary device, or the like.

Figure 13:
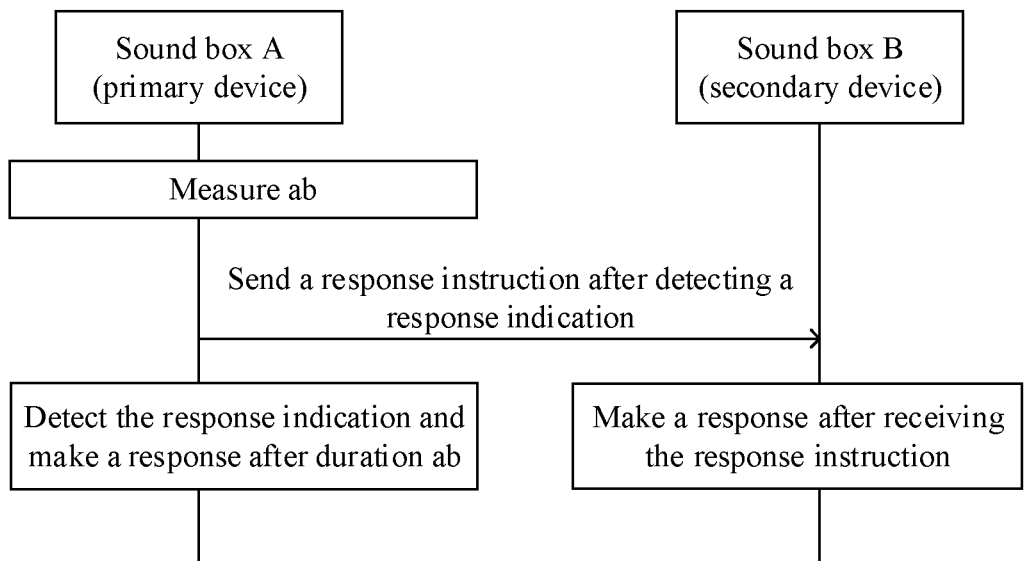
FIG. 13 is another simultaneous response flowchart according to an embodiment of this application.

When T0 is equal to 0, as shown in FIG. 13, the sound box A detects the response indication, and performs response after duration ab. In addition, the sound box A may send a response instruction to the sound box B in response to detecting the response indication. The sound box B may immediately make a response after receiving the response indication.

When T0 is greater than 0, in some cases, the sound box A detects the response indication, and performs response after duration T. In addition, the sound box A may send a response instruction to the sound box B after duration T−ab (namely, T0) in response to detecting the response indication. The sound box B may immediately make a response after receiving the response indication. In some other cases, the sound box A detects the response indication, and performs response after duration T. In addition, the sound box A sends a response instruction to the sound box B in response to detecting the response indication. After receiving the response indication, the sound box B performs response after duration T−ab (namely, T0).

In another application scenario, the group of electronic devices are a group of audio devices. This group of audio devices may be used together, to implement audio stereo playing. For example, the group of audio devices may include a left-channel sound box and a right-channel sound box. For another example, the group of audio devices may include a left-channel headset and a right-channel headset.

In one case, the group of audio devices have been classified as a left-channel device and a right-channel device. In another case, the group of audio devices are specified by the user (for example, specified during pairing) as a left-channel device and a right-channel device. This group of audio devices include one primary device and one secondary device.

After the primary device detects the indication such as the voice instruction, the button operation, or the touch operation from the user, or receives the instruction sent by the cloud server or the secondary device, the primary device and the secondary device may perform simultaneous response by using the methods shown in FIG. 7 to FIG. 13, to control playing such as synchronous stereo playing, synchronous pausing, synchronous volume increase, synchronous volume decrease, and synchronous switching to a next song/previous song. Because simultaneous response consistency between the audio devices is relatively high, a stereo playing effect is relatively good, the user cannot aware that audio in the left channel and the right channel is not synchronized, and hearing experience of the user is relatively good.

In another application scenario, the group of electronic devices are a group of audio and video electronic devices that cooperate with each other. The group of electronic devices may include a video device and an audio device that are used together.

For example, the group of electronic devices include a television and a sound box. The television is configured to play a video picture, and the sound box is configured to play a sound. The group of electronic devices include one primary device (for example, a television) and one secondary device (for example, a sound box). After the primary device detects the indication such as the voice instruction, the button operation, or the touch operation from the user, or receives the instruction sent by the cloud server or the secondary device, the primary device and the secondary device may perform simultaneous response by using the methods shown in FIG. 7 to FIG. 13, to implement synchronous audio and video playing. Because simultaneous response consistency between the group of audio and video devices is relatively high, an audio and video synchronization effect is relatively good, the user cannot aware a delay between a video picture and a sound, and user experience is relatively good.

Figure 14:
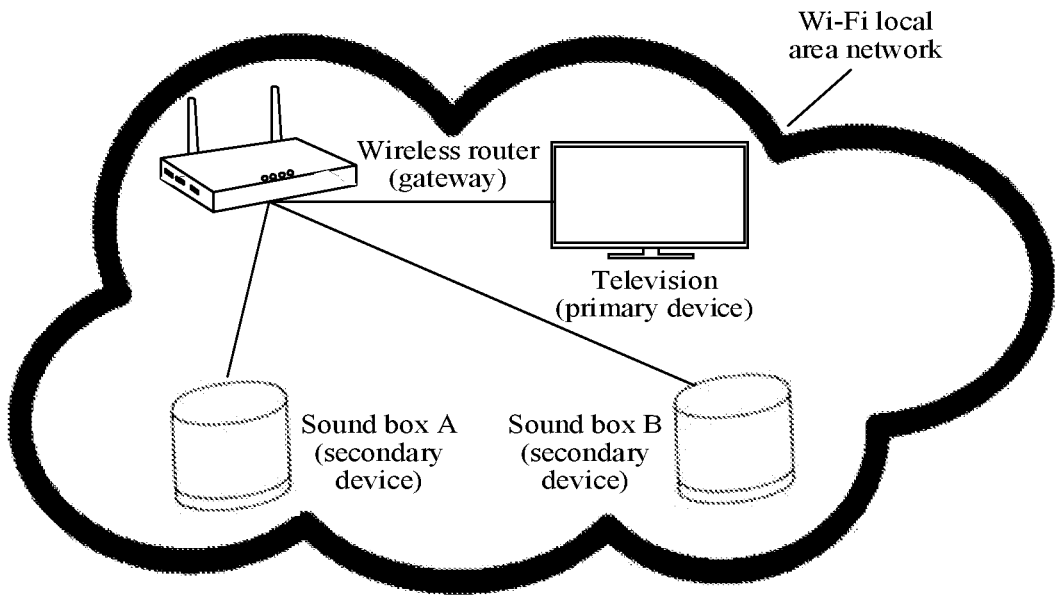
FIG. 14 is a schematic diagram of another simultaneous response scenario according to an embodiment of this application.

For another example, as shown in FIG. 14, the group of electronic devices include one television and two sound boxes. The television is configured to play a video picture, one sound box is configured to play left-channel audio, and the other is configured to play right-channel audio. The group of electronic devices include one primary device (for example, a television) and two secondary devices. The primary device and the secondary devices may perform simultaneous response by using the methods shown in FIG. 7 to FIG. 13, to implement synchronous audio and video playing. Because simultaneous response consistency between the group of audio and video devices is relatively high, an audio and video synchronization effect is relatively good, a stereo playing effect is relatively good, and user experience is relatively good.

For another example, the group of electronic devices include one television and one sound box. The television has a speaker. The television is configured to play a video picture and left-channel audio, and the sound box is configured to play right-channel audio. This group of electronic devices include one primary device and one secondary device. The primary device and the secondary device may perform simultaneous response by using the methods shown in FIG. 7 to FIG. 13, to implement synchronous audio and video playing and implement synchronous stereo audio playing.

In another application scenario, the group of electronic devices are a group of video devices. The group of video devices may be a left-eye image playing device and a right-eye image playing device that are used together. After the primary device detects the indication such as the voice instruction, the button operation, or the touch operation from the user, or receives the instruction sent by the cloud server or the secondary device, the primary device and the secondary device may perform simultaneous response by using the methods shown in FIG. 7 to FIG. 13, to implement playing control such as synchronous playing of a left-eye image and a right-eye image, synchronous pausing, and synchronous video switching. Because simultaneous response consistency between the group of video devices is relatively high, a synchronization effect of the left-eye image and the right-eye image is relatively good.

In another application scenario, the group of electronic devices are a group of audio device and light device that cooperate with each other. The group of electronic devices may include an audio device and a light device that are used together. For example, the group of electronic devices include a sound box and at least one light. Based on a change of a feature such as loudness, a tone, a timbre, a scale, or a frequency of a sound played by the sound box, the light may cooperate to emit light of different colors or perform light blinking at different frequencies, to display different light effects. A primary device in the group of electronic devices may be the sound box, and a secondary device may be the at least one light. After the primary device detects the indication such as the voice instruction, the button operation, or the touch operation from the user, or receives the instruction sent by the cloud server or the secondary device, the primary device and the secondary device may perform simultaneous response by using the methods shown in FIG. 7 to FIG. 13, to implement interweaving and cooperation between music and light. Because simultaneous response consistency is relatively high, the cooperation between sound and light is relatively good, and user experience is relatively good.

The foregoing provides descriptions by mainly using an example in which the group of electronic devices access the same Wi-Fi local area network. The group of electronic devices may also access another type of local area network.

Figure 15:
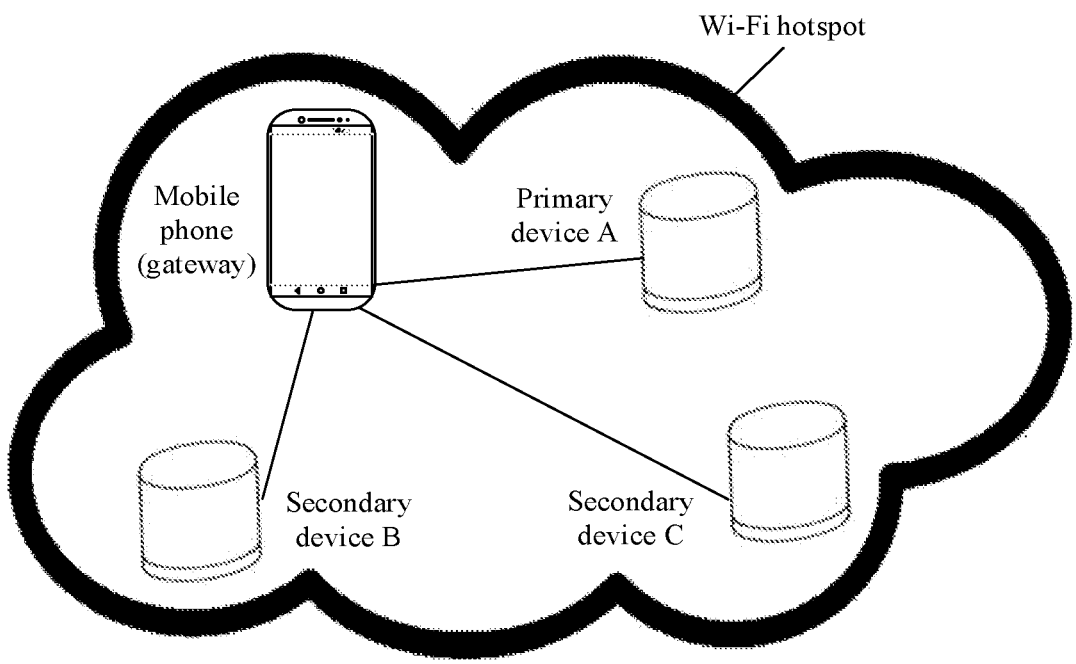
FIG. 15 is a schematic diagram of another simultaneous response scenario according to an embodiment of this application.

For example, in some embodiments, the group of electronic devices may access a same Wi-Fi hotspot. For example, as shown in FIG. 15, a mobile phone enables a Wi-Fi hotspot, and the group of electronic devices access the Wi-Fi hotspot. For example, the group of electronic devices may be a sound box A, a sound box B, and a sound box C that access the Wi-Fi hotspot. In this scenario, a function of the mobile phone is similar to a function of the foregoing wireless router (namely, the gateway). The mobile phone may forward information between a primary device and secondary devices in the group of electronic devices, and may also forward the information between the primary device and the secondary device sin the group of electronic devices with reference to a cloud server. Details are not described again in this embodiment of this application. The primary device and the secondary devices in the group of electronic devices may communicate with each other based on a Wi-Fi hotspot protocol through forwarding of the mobile phone, and perform simultaneous response by using the methods shown in FIG. 7 to FIG. 13.

The foregoing is mainly described by using a Wi-Fi wireless communications technology as an example. The simultaneous response method provided in this embodiment of this application may be further applied to another wireless communications technology, such as Bluetooth, Zigbee, and infrared.

Figure 16:
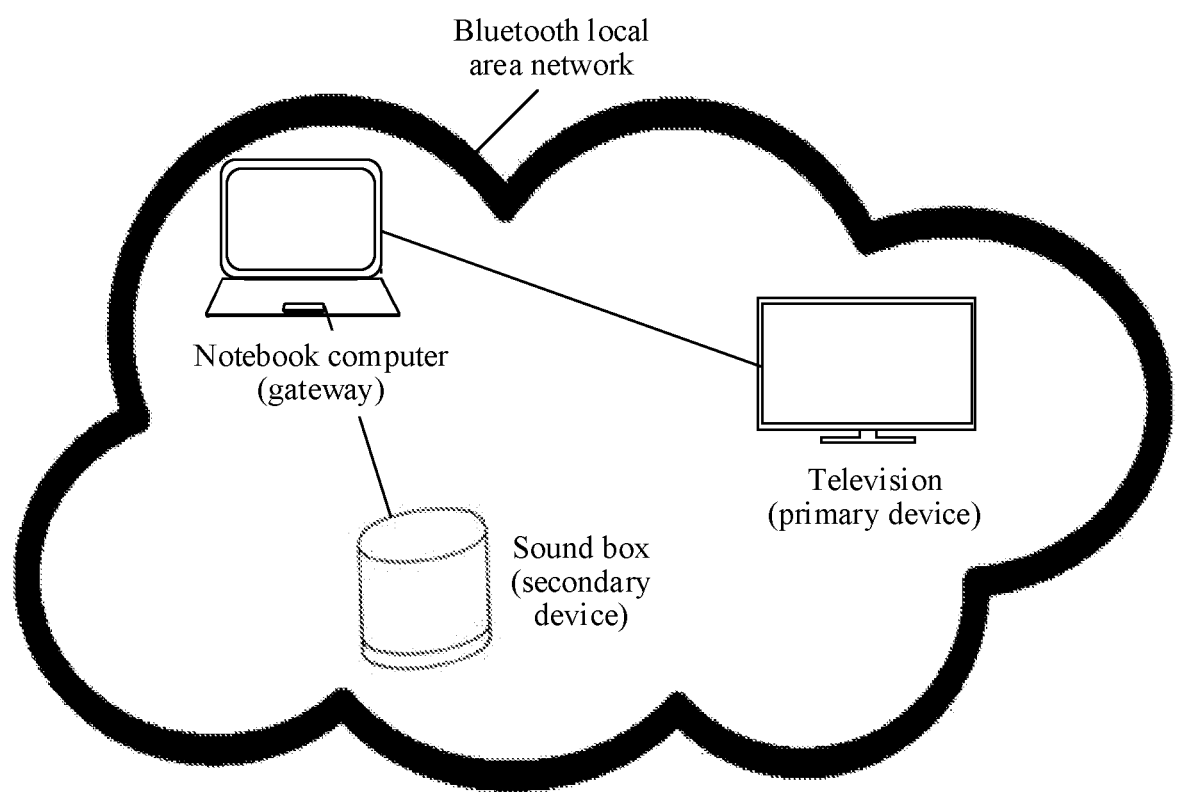
FIG. 16 is a schematic diagram of another simultaneous response scenario according to an embodiment of this application.

For example, a Bluetooth wireless communications technology is used as an example. The group of electronic devices may access a same Bluetooth local area network. For example, a notebook computer supports a Bluetooth protocol (for example, a Bluetooth protocol 4.0 or later). The notebook computer connects to the internet through Wi-Fi or a network cable. The notebook computer enables an ability to share a network through Bluetooth. That is, the notebook computer enables a Bluetooth local area network. The group of electronic devices may connect to the notebook computer through Bluetooth, and access the Bluetooth local area network. A primary device and a secondary device in the Bluetooth local area network perform simultaneous response based on a Bluetooth communications protocol by using the methods shown in FIG. 7 to FIG. 13. For example, as shown in FIG. 16, the group of electronic devices include a television and a sound box. After the electronic device (for example, a television) is connected to the notebook computer through the Bluetooth, whether to use the Bluetooth local area network for communication is prompted to a user. If detecting an operation that the user indicates to use the Bluetooth local area network, the electronic device accesses the Bluetooth local area network. In this scenario, a function of the notebook computer is similar to a function of the foregoing wireless router (namely, the gateway).

It may be understood that the local area network may alternatively be a Bluetooth hotspot, a Zigbee local area network, a Zigbee hotspot, an infrared local area network, an infrared hotspot, or the like. Details are not described herein.

An embodiment of this application further provides an electronic device, including a detection unit, an execution unit, a sending unit, a receiving unit, or the like. These units may perform the steps in the foregoing embodiments, to implement the simultaneous response method.

An embodiment of this application further provides an electronic device, including one or more processors, a memory, and one or more computer programs. The one or more computer programs are stored in the memory, and the one or more computer programs include instructions. When the instructions are executed by the one or more processors, the electronic device is enabled to perform the steps in the foregoing embodiments, to implement the simultaneous response method.

An embodiment of this application further provides a computer storage medium. The computer storage medium stores computer instructions. When the computer instructions are run on an electronic device, the electronic device is enabled to perform the related method steps, to implement the simultaneous response method in the foregoing embodiments.

An embodiment of this application further provides a computer program product. When the computer program product runs on a computer, the computer is enabled to perform the related steps, to implement the simultaneous response method in the foregoing embodiments.

In addition, an embodiment of this application further provides an apparatus. The apparatus may be specifically a chip system. The chip system is applied to an electronic device. The chip system includes one or more interface circuits and one or more processors. The interface circuit is interconnected with the processor through a line. The interface circuit is configured to receive a signal from a memory of the electronic device, and send the signal to the processor, where the signal includes computer instructions stored in the memory. When the processor executes the computer instructions, the electronic device performs the foregoing related steps, to implement the simultaneous response method in the foregoing embodiments.

In addition, an embodiment of this application further provides an apparatus. The apparatus may be specifically a component, or a module. The apparatus may include a processor and a memory that are connected. The memory is configured to store computer-executable instructions. When the apparatus runs, the processor may execute the computer-executable instructions stored in the memory, so that a chip performs the simultaneous response method in the foregoing method embodiments.

The electronic device, the chip, the computer storage medium, the computer program product, or the chip provided in the embodiments of this application may be configured to perform the corresponding method provided above. Therefore, for beneficial effects that can be achieved, refer to the beneficial effects of the corresponding method provided above. Details are not described herein again.

The foregoing descriptions about implementations allow a person skilled in the art to understand that, for the purpose of convenient and brief description, division into the foregoing function modules is used as an example for illustration. In actual application, the foregoing functions can be allocated to different function modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, division into the modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected according to actual requirements to achieve the objectives of the solutions of the embodiments.

In addition, the function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes any medium that can store program code, a USB flash drive, a removable hard disk, a read-only memory (read only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
    detecting, by a first electronic device in a local area network, a response indication;
    sending, by the first electronic device and in response to detecting the response indication, a first response instruction to a second electronic device in the local area network, wherein the first response instruction instructs the second electronic device to perform a first response operation, wherein the first response instruction comprises a target duration (T) and a first time consumption (t1) for a first transmission, and wherein t1 is a first duration for a first data transmission between the first electronic device and the second electronic device;
    sending, by the first electronic device, to a third electronic device in the local area network, and in response to the response indication, a second response instruction instructing the third electronic device to perform a second response operation, wherein the second response instruction comprises T and a second time consumption (t2) for a second transmission, and wherein t2 is a second duration for a second data transmission between the first electronic device and the third electronic device;
    performing, by the first electronic device, a third response operation after T, wherein T is greater than or equal to a maximum time consumption (t) for a third transmission, and wherein t is a larger one of t1 and t2;
    performing, by the second electronic device, the first response operation after a third duration (T−t1) and in response to receiving the first response instruction; and
    performing, by the third electronic device, the second response operation after a fourth duration (T−t2) and in response to receiving the second response instruction.

2. The method of claim 1, wherein before sending T to the second electronic device and the third electronic device, the method further comprises:
    measuring, by the first electronic device, t1 and t2; and
    determining, by the first electronic device, t based on t1 and t2.

3. The method of claim 2, further comprising:
    pairing, by the first electronic device, with the second electronic device and the third electronic device or accessing, by the first electronic device, the local area network; and
    further measuring, by the first electronic device, t1 and t2 after the first electronic device is paired with the second electronic device and the third electronic device or after the first electronic device has accessed the local area network.

4. The method of claim 3, further comprising:
    detecting, by the first electronic device, a voice wake-up indication from a user; or
    receiving, by the first electronic device, wake-up indication information from the second electronic device or the third electronic device.

5. The method of claim 4, wherein the first electronic device, the second electronic device, and the third electronic device are a group of stereo audio devices that cooperate with each other.

6. The method of claim 5, wherein the local area network is a WI-FI network.

7. The method of claim 4, wherein the first electronic device, the second electronic device, and the third electronic device are a group of audio and video devices that cooperate with each other.

8. The method of claim 4, wherein the first electronic device, the second electronic device, and the third electronic device are a group of audio and light devices that cooperate with each other.

9. A method implemented by a first electronic device in a local area network, wherein the method comprises:
    detecting a response indication;
    sending, in response to detecting the response indication, a first response instruction to a second electronic device in the local area network, wherein the first response instruction instructs to perform a first response operation, wherein the first response instruction comprises a target duration (T) and a first time consumption (t1) for a first transmission, and wherein t1 is a first duration for a first data transmission between the first electronic device and the second electronic device;
    sending, in response to the response indication, a second response instruction to a third electronic device in the local area network, wherein the second response instruction instructs to perform a second response operation, wherein the second response instruction comprises T and a second time consumption (t2) for a second transmission, and wherein t2 is a second duration for a second data transmission between the first electronic device and the third electronic device; and
    performing a third response operation after T, wherein T is greater than or equal to a maximum time consumption (t) for a third transmission, wherein t is a larger one of t1 and t2.

10. The method of claim 9, wherein before sending T to the second electronic device and the third electronic device, the method further comprises:
    measuring t1 and t2; and
    determining t based on t1 and t2.

11. The method of claim 10, further comprising:
    pairing with the second electronic device and the third electronic device or accessing the local area network; and
    further measuring t1 and t2 after the first electronic device is paired with the second electronic device and the third electronic device or after the first electronic device accessed the local area network.

12. The method of claim 11, further comprising:
    detecting a voice wake-up indication from a user; or
    receiving wake-up indication information from the second electronic device or the third electronic device.

13. The method of claim 12, wherein the first electronic device, the second electronic device, and the third electronic device are a first group of stereo audio devices that cooperate with each other, a second group of audio and video devices that cooperate with each other, or a third group of audio and light devices that cooperate with each other.

14. The method of claim 13, wherein the local area network is a WI-FI wireless local area network.

15. A first electronic device in a local area network and comprising:
- a memory configured to store instructions; and
- a processor coupled to the memory, wherein when executed by the processor, the instructions cause the first electronic device to:
  - detect a response indication;
  - send, in response to detecting the response indication, a first response instruction to a second electronic device in the local area network, wherein the first response instruction instructs to perform a first response operation, wherein the first response instruction comprises a target duration (T) and a first time consumption (t1) for a first transmission, and wherein t1 is a first duration for a first data transmission between the first electronic device and the second electronic device;
  - send, in response to the response indication, a second response instruction to a third electronic device in the local area network, wherein the second response instruction instructs to perform a second response operation, wherein the second response instruction comprises T and a second time consumption (t2) for a second transmission, and wherein t2 is a second duration for a second data transmission between the first electronic device and the third electronic device; and
  - perform a third response operation after T, wherein T is greater than or equal to a maximum time consumption (t) for a third transmission, and wherein t is a larger one of t1 and t2.

16. The first electronic device of claim 15, wherein before sending T to the second electronic device and the third electronic device, when executed by the processor, the instructions further cause the first electronic device to:
- measure t1 and t2; and
- determine t based on t1 and t2.

17. The first electronic device of claim 16, wherein when executed by the processor, the instructions further cause the first electronic device to:
- pair with the second electronic device and the third electronic device or access the local area network; and
- further measure t1 and t2 after the first electronic device is paired with the second electronic device and the third electronic device or after the first electronic device accessed the local area network.

18. The first electronic device of claim 17, wherein when executed by the processor, the instructions further cause the first electronic device to:
- detect a voice wake-up indication from a user; or
- receive wake-up indication information from the second electronic device or the third electronic device.

19. The first electronic device of claim 18, wherein the first electronic device, the second electronic device, and the third electronic device are a first group of stereo audio devices that cooperate with each other, a second group of audio and video devices that cooperate with each other, or a third group of audio and light devices that cooperate with each other.

20. The first electronic device of claim 19, wherein the local area network is a WI-FI wireless local area network.

* * * * *